US008730435B2

(12) United States Patent
Saigusa et al.

(10) Patent No.: US 8,730,435 B2
(45) Date of Patent: May 20, 2014

(54) LIQUID CRYSTAL DISPLAY DEVICE HAVING RETARDATION FILM FORMED OF LIQUID CRYSTALLINE POLYIMIDE HAVING PHOTOREACTIVE GROUP

(75) Inventors: Kazuhiko Saigusa, Chiba (JP); Norio Tamura, Chiba (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 340 days.

(21) Appl. No.: 13/384,339

(22) PCT Filed: Jun. 30, 2010

(86) PCT No.: PCT/JP2010/061151
§ 371 (c)(1),
(2), (4) Date: Jan. 17, 2012

(87) PCT Pub. No.: WO2011/007669
PCT Pub. Date: Jan. 20, 2011

(65) Prior Publication Data
US 2012/0113338 A1    May 10, 2012

(30) Foreign Application Priority Data
Jul. 17, 2009 (JP) .................................. 2009-168549

(51) Int. Cl.
*G02F 1/1335* (2006.01)
(52) U.S. Cl.
USPC ............ 349/117; 349/118; 349/119; 428/1.3; 252/299.01
(58) Field of Classification Search
USPC ................ 349/117–120; 428/1.3; 252/299.01
See application file for complete search history.

(56) References Cited

U.S. PATENT DOCUMENTS

2006/0082708 A1 *   4/2006   Nagase et al. ................ 349/124

FOREIGN PATENT DOCUMENTS

| JP | 10-212484 | 8/1998 |
|---|---|---|
| JP | 10-310608 | 11/1998 |
| JP | 2003-215341 | 7/2003 |
| JP | 2004-004847 | 1/2004 |
| JP | 2004-109899 | 4/2004 |
| JP | 2004-341030 | 12/2004 |
| JP | 2005-513241 | 5/2005 |
| JP | 2005-171235 | 6/2005 |

(Continued)

OTHER PUBLICATIONS

Demus et al., Handbook of Liquid Crystals, 1998, pp. 3-25, pp. 152-163, vol. 3.

(Continued)

*Primary Examiner* — Michael Caley
(74) *Attorney, Agent, or Firm* — Jianq Chyun IP Office

(57) ABSTRACT

In a liquid crystal display device having a plurality of retardation films for alleviating a deterioration in display quality depending on a viewing angle direction, and a driving liquid crystal layer selected from the group consisting of a driving liquid crystal layer typified by a VA mode wherein a liquid crystal molecule in a driving liquid crystal medium is aligned perpendicular to a substrate when no electric field is applied, a driving liquid crystal layer typified by an IPS mode wherein a liquid crystal molecule in a driving liquid crystal medium is aligned parallel to the substrate when no electric field is applied, and a driving liquid crystal layer that shows optical isotropy when no voltage is applied, a retardation film of a positive A-plate formed of a liquid crystalline polyimide having a photoreactive group is used as at least one layer of the plurality of retardation films.

17 Claims, 6 Drawing Sheets

Equal contrast ratio contour

(56) References Cited

FOREIGN PATENT DOCUMENTS

| | | |
|---|---|---|
| JP | 2005-202313 | 7/2005 |
| JP | 2005-263778 | 9/2005 |
| JP | 2005-275360 | 10/2005 |
| JP | 2006-504998 | 2/2006 |
| JP | 2006-072309 | 3/2006 |
| JP | 2006-188662 | 7/2006 |
| JP | 2006-522947 | 10/2006 |
| JP | 2006-307150 | 11/2006 |
| JP | 2006-330660 | 12/2006 |
| JP | 2007-183580 | 7/2007 |
| JP | 2008-040456 | 2/2008 |
| JP | 2009-069493 | 4/2009 |
| JP | 2009-145496 | 7/2009 |

OTHER PUBLICATIONS

Ohmuro et al., "Development of Super-High-Image-Quality Vertical-Alignment-Mode LCD", SID 97 Digest, 1997, pp. 845-848.

Chen et al., "Optimum Film Compensation Modes for TN and VA LCDs", SID 98 Digest, 1998, pp. 315-318.

* cited by examiner

Equal contrast ratio contour

Equal contrast ratio contour

LIQUID CRYSTAL DISPLAY DEVICE HAVING RETARDATION FILM FORMED OF LIQUID CRYSTALLINE POLYIMIDE HAVING PHOTOREACTIVE GROUP

CROSS-REFERENCE TO RELATED APPLICATION

This application is a 371 of international application of PCT application serial no. PCT/JP2010/061151, filed on Jun. 30, 2010, which claims the priority benefit of Japan application no. 2009-168549, filed on Jul. 17, 2009. The entirety of each of the above-mentioned patent applications is hereby incorporated by reference herein and made a part of this specification.

TECHNICAL FIELD

The present invention relates to a liquid crystal display device to be optically compensated with a retardation film of a positive A-plate based on a liquid crystalline polyimide having a photoreactive group, in particular, a liquid crystal display device of a VA mode, an IPS mode, or an ISP mode.

BACKGROUND ART

A liquid crystal display device has been currently used in, for example, a notebook personal computer, a monitor for a desktop personal computer, a portable digital assistant, or a television by taking advantageous feature such as being thin, light weight, and low power consumption.

The liquid crystal display device originally involves such a problem that its display quality deteriorates in a viewing angle direction. The problem derives from the principle of the liquid crystal display device. The principle of the liquid crystal display device is generally as described below.

That is, the alignment states of the liquid crystal molecules of a driving liquid crystal medium interposed between two substrates each provided with an electrode and an alignment layer are changed by a voltage to be applied to the medium, and then a retardation to be expressed changes depending on the alignment states of these liquid crystal molecules. Further, polarized light entered onto the driving liquid crystal medium from a light source through a polarizer is changed into another polarization state by a retardation to be expressed by the alignment state of each of the liquid crystal molecules upon passing of the driving liquid crystal medium. The quantity in which the light that has passed the driving liquid crystal medium passes a polarizer placed on an observer side changes depending on the changed polarization state.

That is, arbitrarily changing the voltage to be applied to the driving liquid crystal medium controls the quantity of the light that passes the polarizer on the observer side. We acknowledge a combination of a plurality of pixels in each of which the quantity of the light that passes the polarizer on the observer side is controlled as display.

The following two factors are given as factors responsible for the deterioration of the display quality of the liquid crystal display device in the viewing angle direction. One of the factors is that a retardation to be expressed by the driving liquid crystal medium is changed not only by the alignment state of a liquid crystal molecule but also by the direction of light to be entered, that is, the direction in which an observer observes the liquid crystal display device. The other is that an angle formed between the absorption axes of the respective polarizers placed on an incidence side and an emission side changes depending on the direction in which the observer views.

A concept and an approach concerning optical compensation with a retardation film having a specific optical characteristic have been proposed for alleviating the deterioration of the display quality in the viewing angle direction caused by those factors (see, for example, Non Patent Literature 1 and Non Patent Literature 2).

Most of the retardation films have been currently obtained by stretching thermoplastic resins typified by a polycarbonate-based resin and a cyclic olefin-based resin. However, in order to provide a specific optical characteristic to a large area of a retardation film uniformly, a special technology and complicated steps are needed.

A liquid crystal display device optically compensated with a retardation film based on a film in which a liquid crystal is immobilized in a predetermined alignment state has been proposed as a technology that replaces the foregoing (see, for example, Patent Literatures 1 to 4). In this film, a composition containing liquid crystal molecules each provided with a polymerizable functional group (which may hereinafter be referred to as "polymerizable liquid crystal material") is utilized for immobilizing its alignment. A retardation film based on the polymerizable liquid crystal material has, for example, the following advantage. The film can be thinned as compared with the case where a thermoplastic resin is stretched.

However, when the retardation film based on the polymerizable liquid crystal material is actually produced, even any such approach requires that an alignment layer provided with an anchoring energy by being subjected to a rubbing treatment or irradiation with polarized ultraviolet light be provided for uniformly aligning the polymerizable liquid crystal material. Accordingly, a material and a production step for the film are separately needed. In addition, the performance of proper optical compensation typically requires a plurality of retardation films different from each other in the alignment state of a liquid crystal or in thickness, and hence the production steps become additionally complicated. Therefore, an approach with an additionally small production load has been requested for the mass production of such retardation film or a liquid crystal display device having the retardation film.

CITATION LIST

Patent Literature

[PTL 1] Japanese Patent Application Laid-open No. 2004-004847
[PTL 2] Japanese Patent Application Laid-open No. 2004-109899
[PTL 3] Japanese Patent Application Laid-open No. 2006-504998
[PTL 4] Japanese Patent Application Laid-open No. 2006-522947

Non Patent Literature

[NPL 1] DIGEST of SID '97, 845 (1997)
[NPL 2] DIGEST of SID '98, 315 (1998)

SUMMARY OF INVENTION

Technical Problem

An object of the present invention is to alleviate, in a liquid crystal display device mounted with a retardation film for optical compensation to be used for the purpose of improving the viewing angle characteristic of the liquid crystal display device, a load to be applied to the production of the retardation film and the liquid crystal display device.

Solution to Problem

The inventors of the present invention have found a specific structure of a polyamic acid that expresses thermotropic liquid crystallinity by being heated and imidated, and has optical alignment property, and have found that a baked film of the polyamic acid can be utilized as a retardation film as well by virtue of large optical anisotropy obtained as a result of the liquid crystallinity expressed by optically aligning, heating, and imidating a thin film of the acid. Thus, the inventors have completed the present invention described below.

[1] A liquid crystal display device, including: a driving liquid crystal layer selected from the group consisting of a driving liquid crystal layer in which a liquid crystal molecule in a driving liquid crystal medium is aligned in a direction vertical to a substrate when no electric field is applied, a driving liquid crystal layer in which a liquid crystal molecule in a driving liquid crystal medium is aligned in a direction horizontal to the substrate when no electric field is applied, and a driving liquid crystal layer that is optically isotropic when no electric field is applied; and an optical compensator for alleviating a deterioration in display quality in a viewing angle direction, in which the optical compensator has a retardation film of a positive A-plate formed of a liquid crystalline polyimide having a photoreactive group.

[2] The liquid crystal display device according to the item [1], in which the optical compensator is two or more layers of retardation films, and at least one layer thereof is the retardation film of the positive A-plate formed of the liquid crystalline polyimide having a photoreactive group.

[3] The liquid crystal display device according to the item [1], further including one or more polarizers, in which the optical compensator is provided between each of the polarizers and the driving liquid crystal layer.

[4] The liquid crystal display device according to the item [3], in which: the driving liquid crystal layer is the driving liquid crystal layer in which the liquid crystal molecule is aligned in the direction vertical to the substrate when no electric field is applied; the optical compensator has at least two layers of retardation films of positive A-plates each formed of the liquid crystalline polyimide containing a photoreactive group; and the two layers of the retardation films of the positive A-plates each formed of the liquid crystalline polyimide containing a photoreactive group are provided between the driving liquid crystal layer and one of the polarizers so that optical axes thereof are perpendicular to each other.

[5] The liquid crystal display device according to any one of the items [1] to [3], in which: the driving liquid crystal layer is the driving liquid crystal layer in which the liquid crystal molecule is aligned in the direction vertical to the substrate when no electric field is applied; and the optical compensator further has at least one layer of a retardation film of a negative C-plate.

[6] The liquid crystal display device according to the item [5], in which at least one layer of the retardation film of the negative C-plate is an optically anisotropic layer in which alignment of a cholesteric liquid crystal having a helical pitch of less than 200 nm is immobilized by crosslinking or polymerization.

[7] The liquid crystal display device according to the item [6], in which one layer of the optically anisotropic layer is formed on the retardation film of the positive A-plate formed of the liquid crystalline polyimide having a photoreactive group.

[8] The liquid crystal display device according to any one of the items [5] to [7], in which the retardation film of the positive A-plate formed of the liquid crystalline polyimide having a photoreactive group has a retardation $Re_I$ in a direction parallel to a surface of the retardation film in light having a wavelength of 550 nm of between 10 nm and 200 nm, and the retardation film of the negative C-plate has a total retardation $Rth_{II}$ in a normal direction of a surface of the retardation film in the light having a wavelength of 550 nm smaller than a retardation $Rth_{LC}$ of the driving liquid crystal layer in a thickness direction of the driving liquid crystal layer in the light having a wavelength of 550 nm where the $Re_I$ and the $Rth_{II}$ are represented by "$Re_I=(nx_I-ny_I)\cdot d_I$" and "$Rth_{II}=((nx_{II}+ny_{II})/2-nz_{II})\cdot d_{II}$" respectively, $nx_I$ and $ny_I$ represent two components ($nx_I>ny_I$) parallel to a thin-film surface out of three-dimensional refractive indices of the positive A-plate, and $d_I$ represents a thickness of the plate, $nx_{II}$, $ny_{II}$, $nz_{II}$, and $d_{II}$ represent three-dimensional refractive indices and a thickness of the negative C-plate, respectively, the $nx_{II}$ and the $ny_{II}$ ($nx_{II}=ny_{II}$) represent refractive indices in directions parallel to a thin-film surface, and the $nz_{II}$ represents a refractive index in a normal direction of the thin-film surface, and the $Rth_{LC}$ of the driving liquid crystal medium is a numerical value obtained in accordance with definition "$Rth_{LC}=(ne-no)\cdot d_{LC}$" when ordinary light and extraordinary light refractive indices, and a thickness of the driving liquid crystal medium are represented by no, ne, and $d_{LC}$, respectively.

[9] The liquid crystal display device according to any one of the items [1] to [3], in which when refractive indices in directions parallel to a surface of a retardation film are represented by nx and ny provided that the relationship of nx>ny is satisfied, and a refractive index in a normal direction of the surface of the retardation film is represented by nz, the driving liquid crystal layer is the driving liquid crystal layer in which the liquid crystal molecule is aligned in the direction vertical to the substrate when no electric field is applied, and the optical compensator has at least one layer of a retardation film showing biaxiality of nx>ny>nz.

[10] The liquid crystal display device according to the item [9], in which at least one layer of the retardation film showing the biaxiality is an optically anisotropic layer in which a periodic change is caused in a helical pitch in a spiral axis direction in spiral alignment of a cholesteric liquid crystal having a helical pitch of less than 200 nm by irradiating the cholesteric liquid crystal with polarized ultraviolet light having an electric field vector in a direction vertical to a spiral axis, and the alignment of the liquid crystal is immobilized by crosslinking or polymerization.

[11] The liquid crystal display device according to the item [10], in which one layer of the optically anisotropic layer is formed on the retardation film of the positive A-plate formed of the liquid crystalline polyimide having a photoreactive group.

[12] The liquid crystal display device according to any one of the items [1] to [3], in which: the driving liquid crystal layer is the driving liquid crystal layer in which the liquid crystal molecule is aligned in the direction horizontal to the substrate when no electric field is applied; and the optical compensator further has a retardation film of a positive C-plate.

[13] The liquid crystal display device according to any one of the items [1] to [3], in which: the driving liquid crystal layer is the driving liquid crystal layer that is optically isotropic when no electric field is applied; and the optical compensator further has a retardation film of a positive C-plate.

[14] The liquid crystal display device according to the item [12] or [13], in which the retardation film of the positive C-plate includes an optically anisotropic layer in which vertical alignment of a liquid crystal is immobilized by crosslinking or polymerization.

[15] The liquid crystal display device according to any one of the items [12] to [14], in which the retardation film of the positive A-plate formed of the liquid crystalline polyimide having a photoreactive group has a retardation $Re_I$ in a direction parallel to a surface of the retardation film in light having a wavelength of 550 nm of between 10 nm and 200 nm, and the retardation film of the positive C-plate has a retardation $Rth_{III}$ in a normal direction of a surface of the retardation film in the light having a wavelength of 550 nm of between −200 nm and −10 nm where the $Re_I$ is represented by "$Re_I=(nx_I-ny_I)\cdot d_I$", $nx_I$ and $ny_I$ represent two components $(nx_I>ny_I)$ parallel to a thin-film surface out of three-dimensional refractive indices of the positive A-plate, and $d_I$ represents a thickness of the plate, the $Rth_{III}$ is represented by "$Rth_{III}=(nx_{III}+ny_{III})/2-nz_{III})\cdot d_{III}$", $nx_{III}$, $ny_{III}$, $nz_{III}$, and $d_{III}$ represent three-dimensional refractive indices and a thickness of the positive C-plate, respectively, the $nx_{III}$ and the $ny_{III}$ represent refractive indices in directions parallel to a thin-film surface, and the $nz_{III}$ represents a refractive index in a normal direction of the thin-film surface.

[16] The liquid crystal display device according to any one of the items [1] to [15], including a color filter substrate having a color filter and a retardation film, in which the retardation film includes the retardation film of the positive A-plate formed of the liquid crystalline polyimide containing a photoreactive group.

[17] The liquid crystal display device according to any one of the items [1] to [15], including an elliptically polarizer having a polarizer integrated with a retardation film, in which the retardation film includes the retardation film of the positive A-plate formed of the liquid crystalline polyimide having a photoreactive group.

Advantageous Effects of Invention

The retardation film based on the liquid crystalline polyimide having a photoreactive group does not require any alignment layer, and hence can be produced with smaller numbers of members and steps than those of a conventional retardation film based on a polymerizable liquid crystal material. In addition, as in a conventional optical alignment layer based on an aligning agent, the retardation film can be utilized as an alignment layer for a liquid crystalline material typified by a driving liquid crystal medium or a polymerizable liquid crystal material. Therefore, the use of the retardation film based on the liquid crystalline polyimide having a photoreactive group in a liquid crystal display device to be mounted with a retardation film for the purpose of optical compensation alleviates a load to be applied upon production of the retardation film or the liquid crystal display device.

DESCRIPTION OF EMBODIMENTS

Figure 1:
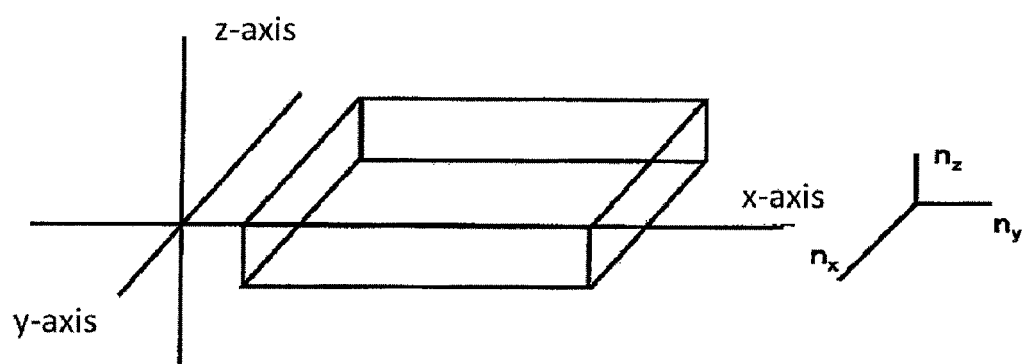
FIG. 1 is a view for illustrating the definition of the three-dimensional refractive indices of a retardation film.

A liquid crystal display device of the present invention includes: a driving liquid crystal layer selected from a driving liquid crystal layer in which a liquid crystal molecule in a driving liquid crystal medium is aligned in a direction vertical to a substrate when no electric field is applied, a driving liquid crystal layer in which a liquid crystal molecule in a driving liquid crystal medium is aligned in a direction horizontal to the substrate when no electric field is applied, and a driving liquid crystal layer that is optically isotropic when no electric field is applied; and an optical compensator. The optical compensator has at least one layer of a retardation film of a positive A-plate formed of a liquid crystalline polyimide having a photoreactive group (which may hereinafter be referred to as "liquid crystalline polyimide film having photoreactive group").

The optical compensator is a retardation film for alleviating the deterioration of display quality in a viewing angle direction in the liquid crystal display device. The optical compensator may be constructed of one layer of a retardation film, or may be constructed of two or more layers of retardation films as long as the deterioration of the display quality due to the viewing angle direction in the liquid crystal display device can be alleviated. In addition, when the plate is constructed of two or more layers of retardation films, part or the entirety of the retardation films may be integrally laminated, or part or the entirety of the retardation films may be independently placed in a laminating direction.

The optical compensator is preferably constructed of two or more layers of retardation films including a liquid crystalline polyimide film having a photoreactive group from such a viewpoint that a sufficient optical compensation effect is obtained. When the optical compensator is constructed of two or more layers of retardation films, the optical characteristics of the two or more layers of the retardation films may be identical to each other, or may be different from each other. In addition, all the two or more layers of the retardation films may be positive A-plates, or the films may include one or two or more layers of positive A-plates and one or two or more layers of retardation films having other optical characteristics each obtained from a material except the liquid crystalline polyimide. In addition, all the positive A-plates may each be the liquid crystalline polyimide film having a photoreactive group, or the plates may include the liquid crystalline polyimide film having a photoreactive group and a positive A-plate obtained from any other material. The kinds and combination of retardation films that construct the optical compensator can be appropriately determined depending on the optical anisotropy of the driving liquid crystal layer specified by the alignment state, birefringence, or the like of the driving liquid crystal medium, or in view of a load in the production steps of each of the retardation films and the liquid crystal display device mounted with the films. It should be noted that the liquid crystal display device of the present invention may further include a retardation film to be provided for a purpose except optical compensation.

<Liquid Crystalline Polyimide Having Photoreactive Group>

The term "liquid crystalline polyimide having a photoreactive group" (which may hereinafter be referred to as "liquid crystalline polyimide") is a generic name for the following liquid crystalline polyimide. The polyimide has a photoreactive group on its main chain or a side chain thereof, and shows liquid crystallinity such as thermotropic liquid crystallinity or lyotropic liquid crystallinity. Although specific structures of the liquid crystalline polyimide are given below, the following specific examples do not limit the scope of the present invention.

Although the average molecular weight of the liquid crystalline polyimide is not particularly limited, its weight-average molecular weight is preferably $5\times10^3$ or more, more preferably $1\times10^4$ or more from the viewpoints of the prevention of the evaporation of the liquid crystalline polyimide during the baking of a coating film and the expression of preferred physical properties in the material. In addition, the weight-average molecular weight is preferably $1\times10^6$ or less from such a viewpoint that the handling of the material in terms of, for example, viscosity is facilitated.

The weight-average molecular weight of the liquid crystalline polyimide is measured by a gel permeation chromatography (GPC) method. For example, the weight-average molecular weight is determined by: diluting the liquid crystalline polyimide or a polyamic acid as a precursor thereof with dimethylformamide (DMF) so that the concentration of the liquid crystalline polyimide or the precursor thereof may be about 1 wt %; measuring the weight-average molecular weight of the diluted solution with, for example, a CHROMATOPAC C-R7A (manufactured by Shimadzu Corporation) and with DMF as a developing solvent by the gel permeation chromatography (GPC) method; and converting the resultant value in terms of polystyrene. Further, a developing solvent prepared by dissolving an inorganic acid such as phosphoric acid, hydrochloric acid, nitric acid, or sulfuric acid, or an inorganic salt such as lithium bromide or lithium chloride in a DMF solvent may be used from the viewpoint of an improvement in the accuracy of the GPC measurement.

The photoreactive group is a group that aligns a specific molecular structure in the liquid crystalline polyimide such as a mesogen group toward one direction by irradiation with specific light. The number of photoreactive groups may be one, or may be two or more. For example, azobenzene has been known to undergo the following photoisomerization reaction. When azobenzene is irradiated with linearly polarized light in a wavelength range of 300 to 400 nm, azobenzene changes into a trans body having the major axis of the molecular structure of azobenzene in a direction perpendicular to the polarization direction. Such a group that changes into a specific structure by a photoisomerization reaction or a photocrosslinking reaction through irradiation with specific light as described above can be used as the photoreactive group. A photoreactive group that undergoes a photoisomerization reaction is, for example, an azo group as a group containing a double bond between nitrogen atoms, a vinylene group as a group containing a double bond between carbon atoms, or an ethynyl group as a group containing a triple bond between carbon atoms. A photoreactive group that undergoes a photocrosslinking reaction is, for example, a group having a cinnamic acid structure, a group having a coumaric acid structure, or a group having chalconic acid. The photoreactive group is preferably the photoreactive group that undergoes a photoisomerization reaction.

The content of the photoreactive group in the liquid crystalline polyimide is preferably 10 to 50 mol % with respect to an imide group in the liquid crystalline polyimide from such a viewpoint that the mesogen group is aligned in a predetermined direction depending on light to be applied.

The liquid crystalline polyimide is constructed of the photoreactive group, the mesogen group as a rigid molecular structure, and a spacer group as a flexible molecular structure. A main chain-type liquid crystalline polyimide can be constructed by constructing a main chain containing the photoreactive group, the mesogen group, and the spacer group, and a side chain-type liquid crystalline polyimide can be constructed by constructing a side chain containing the photoreactive group, the mesogen group, and the spacer group. Known structures can be adopted as the mesogen group and the spacer group. Examples of the mesogen group include groups each containing an aromatic imide ring, azobenzene, biphenyl, phenyl benzoate, azoxybenzene, stilbene, or terphenyl. The spacer group is, for example, a linear alkyl group having about 1 to 20 carbon atoms.

The liquid crystalline polyimide film having a photoreactive group can be obtained by: forming a coating film of a solution of the liquid crystalline polyimide or a precursor thereof; irradiating the formed coating film with specific light to align the liquid crystalline polyimide or the precursor thereof by a reaction based on the photoreactive group; and baking the optically aligned coating film. The liquid crystalline polyimide or the precursor thereof has only to be a compound that is optically aligned by being irradiated with specific light in the coating film. In addition, the liquid crystalline polyimide is a polyimide showing liquid crystallinity at least during a time period commencing on the optical alignment and ending on the formation of the retardation film, and may be a polyimide showing liquid crystallinity in the solution or the coating film, or may be a polyimide showing liquid crystallinity in the retardation film after the baking. The liquid crystalline polyimide is, for example, a polyimide that has the photoreactive group and a mesogen structure, and dissolves in a solvent to be described later at a concentration of 1 wt % or more. The precursor of the liquid crystalline polyimide is, for example, a polyamic acid having the photoreactive group and the mesogen structure.

It should be noted that the concentration of the liquid crystalline polyimide can be determined depending on an application of the liquid crystalline polyimide film. For example, in the case where the liquid crystalline polyimide film is used in an application where a retardation as small as about 10 nm is needed, the concentration of the liquid crystalline polyimide can be determined as 1 wt % as such a concentration of the liquid crystalline polyimide that a thickness of about 30 nm which is considered to be a sufficient thickness when the birefringence of the material is taken into consideration is obtained.

In the present invention, the axial angle of the optical axis or the magnitude of the retardation in the liquid crystalline polyimide film can be adjusted by irradiating the coating film with specific light.

For example, in the present invention, vertical application of linearly polarized light to the coating film can provide a liquid crystalline polyimide film whose optical axis is parallel to the polarization direction of the applied light. In addition, in the present invention, vertical application of elliptically polarized light to the coating film can provide a liquid crystalline polyimide film whose optical axis is parallel to the major axis direction of the elliptically polarized light. Further, in the present invention, vertical application of unpolarized light to the coating film can provide a liquid crystalline polyimide film the orientation of the optical axis of which is not specified.

In addition, for example, in the present invention, the magnitude of a birefringence Δn of the liquid crystalline polyimide film can be adjusted, and the magnitude of a retardation Re of the liquid crystalline polyimide film can also be adjusted in proportion to the irradiation energy intensity of the light to be applied to the coating film. That is, the Δn or the Re can be enlarged by enlarging the irradiation energy intensity of the light to be applied to the coating film, and the Δn or the Re can be reduced by reducing the irradiation energy intensity of the light to be applied to the coating film.

In addition, for example, in the present invention, the magnitude of the Re can be adjusted in proportion to the thickness of the liquid crystalline polyimide film. That is, the Re can be enlarged by enlarging the thickness of the liquid crystalline polyimide film, and the Re can be reduced by reducing the thickness of the liquid crystalline polyimide film. The thickness of the liquid crystalline polyimide film can be adjusted depending on, for example, the viscosity or concentration of a solution of the liquid crystalline polyimide or a solution of the precursor thereof, or the number of times of application of any such solution, and the thickness can be enlarged by increasing at least one of the viscosity, the concentration, and the number. Further, in the present invention, the Re or the Δn can be adjusted by using two or more kinds of the liquid crystalline polyimides in combination.

The light to be applied to the coating film for optical alignment has only to be light that prompts the photoreactive group described in the foregoing to cause a reaction for changing the orientation of the liquid crystalline polyimide. Such light is, for example, light (ultraviolet light) having a wavelength of 300 to 400 nm. The irradiation energy intensity of the applied light is preferably less than 10 J/cm² from, for example, such a viewpoint that moderate alignment is imparted to the polyamic acid.

In addition, when a liquid crystal layer is formed on the liquid crystalline polyimide film, the liquid crystalline polyimide film can align a liquid crystal molecule along the orientation of the optical axis of the liquid crystalline polyimide. Further, when a liquid crystal layer is formed on the liquid crystalline polyimide film after the surface of the liquid crystalline polyimide film has been subjected to a rubbing treatment, a liquid crystal molecule can be aligned along the rubbing direction irrespective of the orientation of the optical axis of the liquid crystalline polyimide.

In addition, when a liquid crystal layer is formed on the liquid crystalline polyimide film after the surface of the liquid crystalline polyimide film has been irradiated with ultraviolet light, the pretilt angle of a liquid crystal molecule in the liquid crystal layer can be adjusted by mixing, into a solution of the precursor of the liquid crystalline polyimide, a polyamic acid having a diamine having a specific structure (side chain structure) that provides the pretilt angle of the liquid crystal molecule as described in Japanese Patent Application Laid-open No. 2009-69493. Further, in the liquid crystalline polyimide film, the pretilt angle can be reduced by irradiating a coating film of the solution with specific polarized ultraviolet light (such as polarized ultraviolet light having a wavelength as short as 300 nm or less).

In addition, the liquid crystalline polyimide film has high heat resistance because the film is a polyimide film. Further, the liquid crystalline polyimide film has a stable optical characteristic that changes to a small extent even after the application of a thermal load exceeding 200° C. Therefore, when other one or two or more layers such as a film are further formed on the liquid crystalline polyimide film, the liquid crystalline polyimide film can resist even a production environment for the liquid crystal display device where a baking step to be performed for forming these layers is repeatedly performed, and hence can be applied to a wide variety of liquid crystal display devices.

(Preferred Examples of Polyamic Acid Having Photoreactive Group as Precursor of Liquid Crystalline Polyimide Having Photoreactive Group)

Next, specific examples of the liquid crystalline polyimide having a photoreactive group are described. A preferred example thereof is a composition containing at least one polymer selected from a polyamic acid having a photoreactive group on its main chain and a polyimide obtained by the dehydration reaction of the acid, the composition having the following feature: the composition has a liquid crystal temperature range between 100° C. and 300° C. Table 1 shows compounds, i.e., a diamine and an acid anhydride that construct a polyamic acid having such feature, and Table 2 shows examples of the combination of the compounds.

TABLE 1

| | Diamine | Acid anhydride |
|---|---|---|
| Polyamic acid 1 | At least one of diamine group I | At least one of acid anhydride group I |
| Polyamic acid 2 | At least one of diamine group II | At least one of acid anhydride group II |
| Polyamic acid 3 | Mixture of at least one of diamine group I and at least one of diamine group II or diamine group III | At least one of acid anhydride group I (corresponding to diamine group I or III), or at least one of acid anhydride group II (corresponding to diamine group II) |
| Polyamic acid 4 | At least one of diamine group II | Mixture of at least one of acid anhydride group I and at least one of acid anhydride group II |

TABLE 2

| Diamine | Acid anhydride |
|---|---|
| Diamine group 1 Diamine having photoreactive group Compounds (I-1) to (I-3), (II-1) to (II-3), (III-1), (IV-1) to (IV-3), (V-1), and (VI-1) to (VI-6) | Acid anhydride group I Acid anhydride free of any photoreactive group Formulae (VII-4) and (VII-5) |
| Diamine group II Diamine free of any photoreactive group Formulae (VII-1) to (VII-3) | Acid anhydride group II Acid anhydride having photoreactive group Compounds (IV-4) and (VI-8) |
| Diamine group III Diamine free of any photoreactive group Compounds (VIII-1) to (VIII-5) | Acid anhydride group III Acid anhydride free of any photoreactive group Compounds (VIII-7) and (VIII-8) |

[Chem. 1]

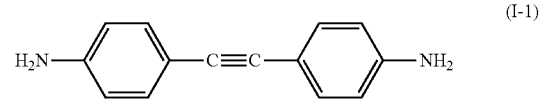

(I-1)

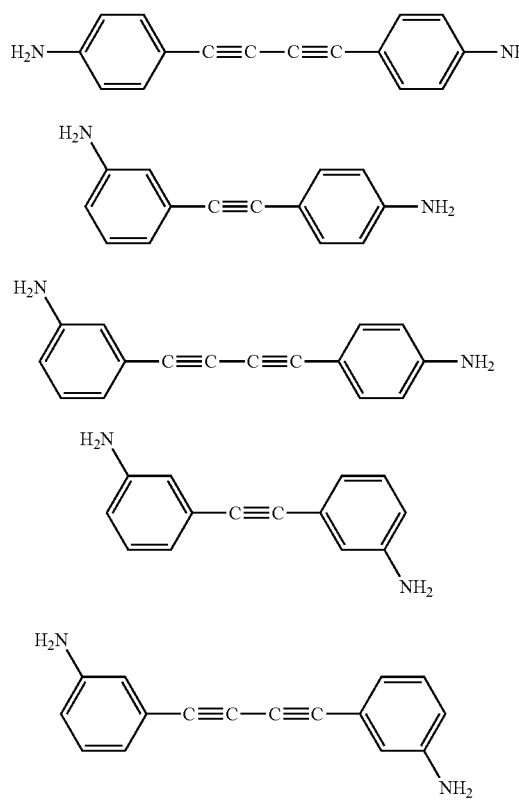
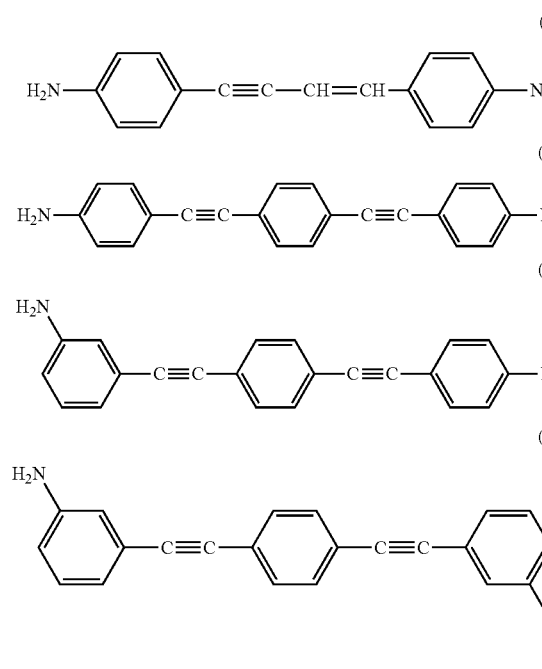
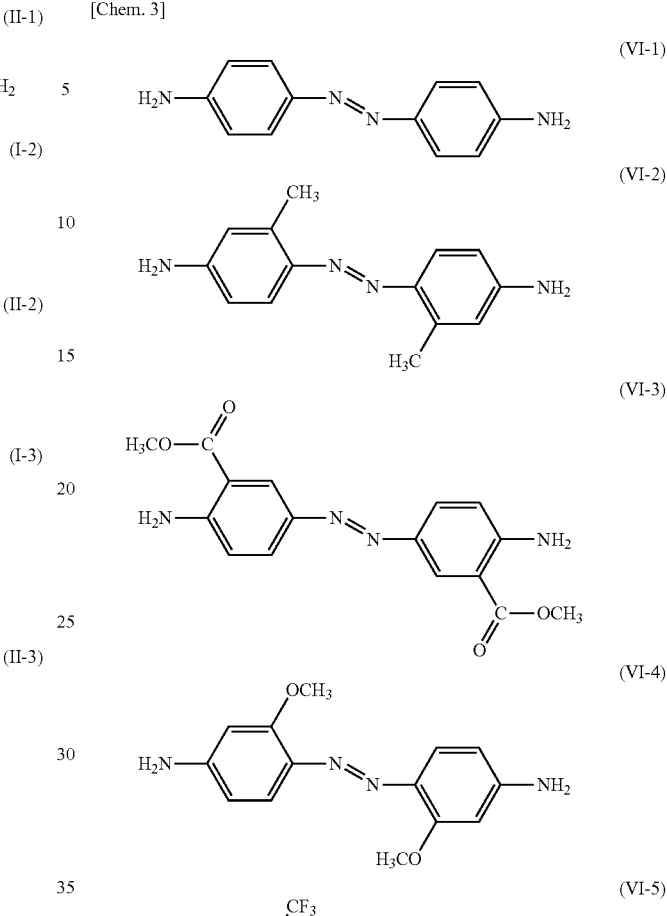
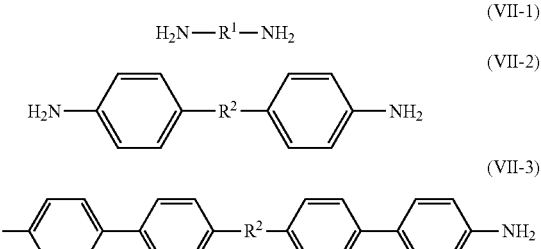
In the formula (VII-1), $R^1$ represents an alkylene having 6 to 20 carbon atoms. The number of carbon atoms is preferably 6 to 12. In addition, in the formulae (VII-2) and (VII-3), $R^2$ represents an alkylene having 6 to 20 carbon atoms in which one —$CH_2$— may, or two —$CH_2$—'s not adjacent to each other may each, be substituted with —O—, —NH—, —N($CH_3$)—, —Si($CH_3$)$_2$OSi($CH_3$)$_2$—, or —COO—.

[Chem. 5]

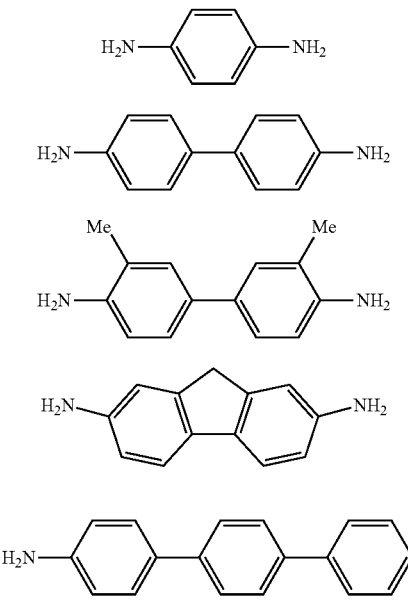

(VIII-1)
(VIII-2)
(VIII-3)
(VIII-4)
(VIII-5)

[Chem. 6]

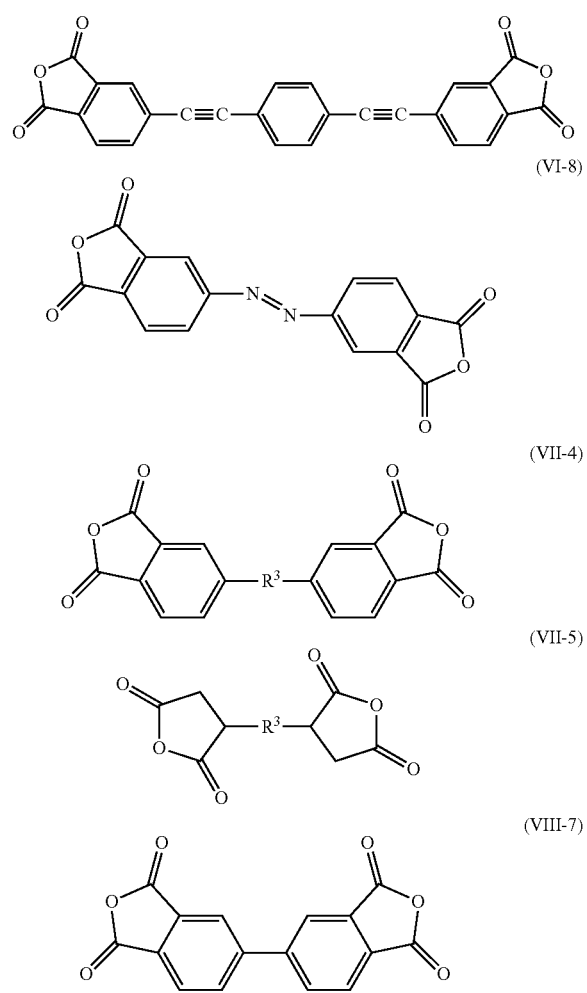

(IV-4)
(VI-8)
(VII-4)
(VII-5)
(VIII-7)

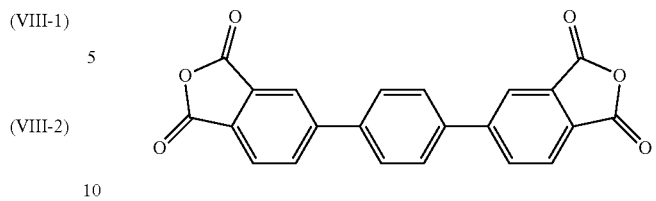

(VIII-8)

In the formulae (VII-4) and (VII-5), $R^3$ represents an alkylene having 6 to 20 carbon atoms in which one —$CH_2$— may, or two —$CH_2$—'s not adjacent to each other may each, be substituted with —O—, —NH—, —N($CH_3$)—, —Si($CH_3$)$_2$ OSi($CH_3$)$_2$—, or —COO—.

The liquid crystalline polyimide is, for example, a material containing a polyimide obtained by the dehydration reaction of a polyamic acid selected from the above-mentioned four preferred polyamic acids. The number of polyamic acids to be selected may be two or more.

In addition, in the present invention, a diamine except the diamines listed in the foregoing description or an acid anhydride except the acid anhydrides listed in the foregoing description can be used in combination. Examples of the diamine that can be used in combination include diamines described in the paragraphs 0077 to 0098 of Japanese Patent Application Laid-open No. 2009-69493. In addition, examples of the acid anhydride that can be used in combination include acid anhydrides described in the paragraphs 0103 to 0125 of Japanese Patent Application Laid-open No. 2009-69493 as in the foregoing.

The examples of the acid anhydride that can be used in combination further include compounds represented by formulae (IX-1) to (IX-4). A polyamic acid containing a structure based on any such acid anhydride is preferred from the viewpoint of an improvement in the solubility of even a polyimide obtained by imidating the acid in a solvent.

[Chem. 7]

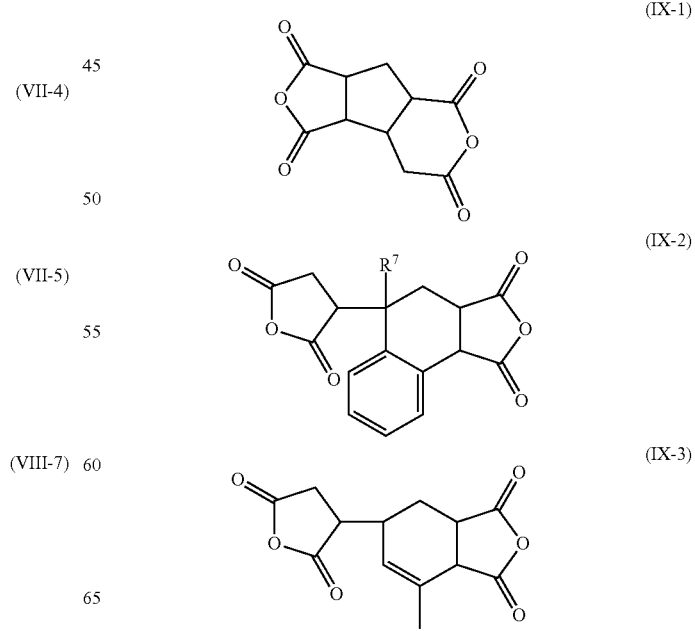

(IX-1)
(IX-2)
(IX-3)

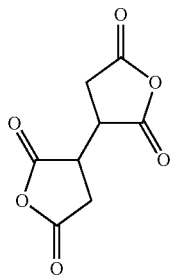

(IX-4)

In the formula (IX-2), $R^7$ represents hydrogen or a methyl group.

For example, the polyamic acid can adopt various compositions from the viewpoints of desired characteristics upon utilization of its function as a retardation film or a combination of its two functions as a retardation film and an alignment layer. For example, the polyamic acid may be such a copolymer that the diamine is formed of a diamine having a photoreactive group and a diamine free of any photoreactive group, or may be such a copolymer that the acid anhydride is formed of an acid anhydride having a photoreactive group and an acid anhydride free of any photoreactive group. Further, a mixture of polyamic acids having two or more kinds of photoreactive groups, or a mixture of a polyamic acid having a photoreactive group and a polyamic acid free of any photoreactive group can be used as the polyamic acid.

The content of the photoreactive group in the polyamic acid is more preferably 10 to 50 mol % with respect to an imide group of the polyamic acid when it is assumed that 100% of the polyamic acid is imidated from such a viewpoint that a mesogen group is aligned in a predetermined direction in accordance with polarized light to be applied.

(Addition of Material Different from Preferred Polyamic Acid)

In the present invention, a material except the liquid crystalline polyimide or the precursor thereof (which may hereinafter be referred to as "additive") can be further incorporated into a material for forming the coating film containing the liquid crystalline polyimide or the precursor thereof to such an extent that the liquid crystallinity of the liquid crystalline polyimide is obtained. The number of kinds of additives may be one, or may be two or more. For example, when the liquid crystalline polyimide or the precursor thereof is any one of the four polyamic acids listed above, the additive can be incorporated in a total amount of up to less than 50 parts by weight with respect to 100 parts by weight of the polyamic acid into the material to such an extent that such feature that the liquid crystalline polyimide has a liquid crystal temperature range between 100° C. and 300° C. is obtained.

(Polyamic Acid Free of any Photoreactive Group)

In the present invention, a polyamic acid containing no photoreactive group may be incorporated as the additive into the material. Examples of such polyamic acid include a linear polyamic acid and a polyamic acid having a side chain structure. Any such polyamic acid can be added from the viewpoint of an improvement in an electrical characteristic or alignment characteristic of the retardation film to be obtained, or an improvement or change in the alignment characteristic of a liquid crystal upon, for example, utilization of the film as an alignment layer for a driving liquid crystal medium or a liquid crystalline material as well.

(Non-Polyimide-Based Liquid Crystal Polymer)

In addition, in the present invention, a non-polyimide-based liquid crystal polymer may be incorporated as the additive into the material from the viewpoint of an improvement in liquid crystallinity. Examples of the liquid crystal polymer include such a main chain-type thermotropic liquid crystal polymer and side chain-type thermotropic liquid crystal polymer as described in Handbook of Liquid Crystals Vol. 3 (published by WILEY-VCH in 1998).

(Polymerizable Liquid Crystal Compound)

In addition, in the present invention, a liquid crystalline compound having a polymerizable functional group may be incorporated as the additive into the material from the viewpoint of, for example, an improvement in liquid crystallinity. Specific examples of such polymerizable liquid crystal compound are given below.

[Chem. 8]

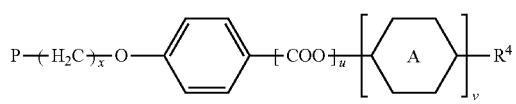

(X-1)

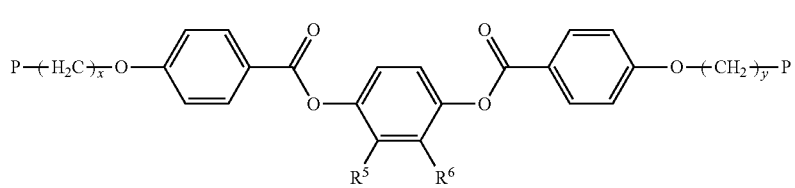

(X-2)

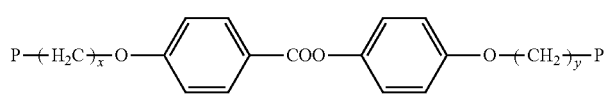

(X-3)

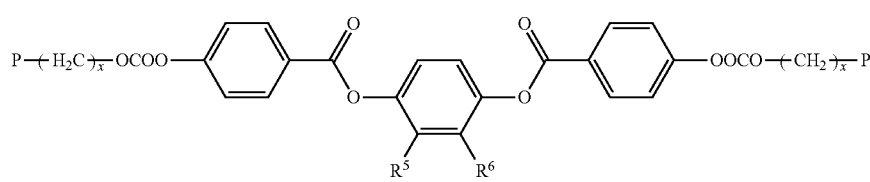
(X-4)

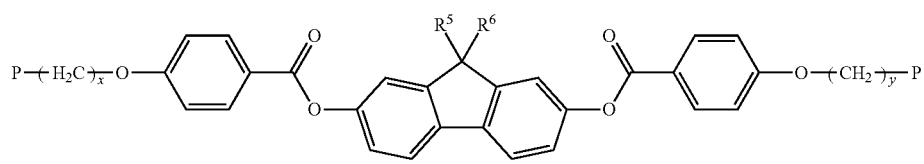
(X-5)

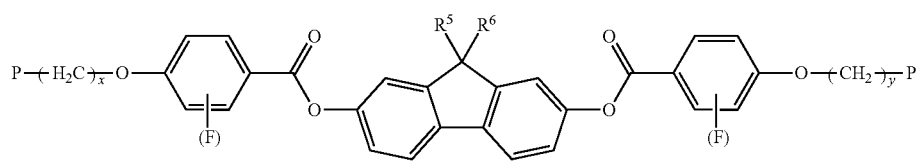
(X-6)

In the formulae, P represents a polymerizable functional group. In addition, in the formulae, $R^4$ each independently represent —F, —Cl, —CN, —$NO_2$, —OH, —$OCH_3$, —OCN, —SCN, —$OCF_3$, an alkyl having 1 to 12 carbon atoms which may be halogenated, an alkylcarbonyl whose alkyl has 1 to 12 carbon atoms, an alkoxycarbonyl whose alkoxy has 1 to 12 carbon atoms, an alkylcarbonyloxy whose alkyl has 1 to 12 carbon atoms, or an alkoxycarbonyloxy whose alkoxy has 1 to 12 carbon atoms. In addition, in the formulae, $R^5$ and $R^6$ each represent —H, —F, —Cl, —CN, or an alkyl having 1 to 7 carbon atoms which may be halogenated, an alkoxy having 1 to 7 carbon atoms, an alkylcarbonyl whose alkyl has 1 to 7 carbon atoms, an alkylcarbonyloxy whose alkyl has 1 to 7 carbon atoms, or an alkoxycarbonyloxy whose alkoxy has 1 to 7 carbon atoms. In addition, in the formulae, A represents 1,4-phenylene or 1,4-cyclohexylene which may be mono-, di-, or tri-substituted with $R^5$ except hydrogen. In addition, in the formulae, u represents 0 or 1, v represents 0, 1, or 2, and x and y each independently represent 1 to 12.

Preferred examples of the polymerizable functional group include the following structures. In the case where there exist two polymerizable functional groups P in one molecule, the two polymerizable functional groups P may be the same or different.

[Chem. 9]

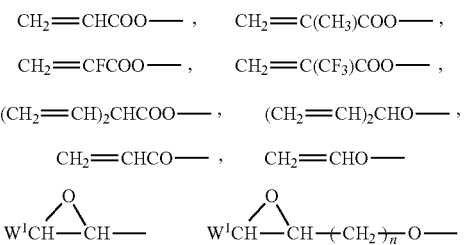

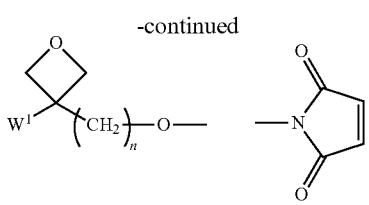

In the formulae, $W^1$ represents —H or an alkyl having 1 to 5 carbon atoms, and n represents 0 or 1.

(Crosslinking Agent)

In addition, in the present invention, a compound having two or more functional groups each of which reacts with a carboxylic acid residue of the polyamic acid, i.e., the so-called crosslinking agent may be further incorporated as the additive into the material from the viewpoint of the prevention of the deterioration of any characteristic over time or its deterioration due to an environment. Examples of such crosslinking agent include such a polyfunctional epoxy and isocyanate material as described in Japanese Patent No. 3049699, Japanese Patent Application Laid-open No. 2005-275360, and Japanese Patent Application Laid-open No. Hei 10-212484.

Such a crosslinking agent as described below can also be used for the same purpose as that described above. The crosslinking agent itself reacts to serve as a polymer having a network structure, thereby improving the strength of a polyamic acid or polyimide film. Examples of such crosslinking agent include such a polyfunctional vinyl ether, maleimide, and bisallyl nadimide derivative as described in Japanese Patent Application Laid-open Hei 10-310608 and Japanese Patent Application Laid-open No. 2004-341030.

The content of any such crosslinking agent is preferably less than 50 parts by weight, more preferably less than 30 parts by weight with respect to 100 parts by weight of the polyamic acid as the precursor of the liquid crystalline polyimide.

(Organosilicon Compound)

In addition, in the present invention, an organosilicon compound may be further incorporated as the additive into the material from the viewpoint of adjusting the adhesiveness to a glass substrate. Examples of the organosilicon compound include silane coupling agents such as aminopropyltrimethoxysilane, aminopropyltriethoxysilane, vinyltrimethoxysilane, N-(2-aminoethyl)-3-aminopropylmethyldimethoxysilane, N-(2-aminoethyl)-3-aminopropyltrimethoxysilane, vinyltriethoxysilane, 3-methacryloxypropyltrimethoxysilane, 3-glycidoxypropyltrimethoxysilane, 3-glycidoxypropylmethyldimethoxysilane, and 2-(3,4-epoxycyclohexyl)ethyltrimethoxysilane, and silicone oils such as dimethylpolysiloxane, polydimethylsiloxane, and polydiphenylsiloxane. The addition amount of the organosilicon compound is preferably 0.01 to 5 parts by weight, more preferably 0.1 to 3 parts by weight with respect to 100 parts by weight of the liquid crystalline polyimide or the precursor thereof.

(Other Additives)

In addition, in the present invention, various additives may each be further incorporated into the material as desired. For example, when an additional improvement in application property is desired, a surfactant in accordance with such purpose may be incorporated in an appropriate amount into the material; when an additional improvement in antistatic performance is desired, an antistatic agent may be incorporated in an appropriate amount into the material; or when a polymerizable liquid crystal compound or a crosslinking agent is incorporated, a polymerization initiator may be incorporated in an appropriate amount into the material for accelerating the polymerization reaction of the compound or the crosslinking reaction of the agent.

Hereinafter, the material containing the liquid crystalline polyimide or the precursor thereof, and any such additive as described in the foregoing is referred to as "material for a retardation film."

<Approach for Obtaining Liquid Crystalline Polyimide Film Having Photoreactive Group>

The material for a retardation film can be used in the form of being dissolved in a solvent having an ability to dissolve the material. Hereinafter, such form is referred to as "material solution for a retardation film." Such solvent comprehends a wide variety of solvents typically used in the production or use of a polyamic acid or a derivative thereof, and can be appropriately selected depending on its intended use. Examples of such solvent are given below.

Examples of aprotic polar organic solvents which are good solvents for polyamic acid include lactones such as N-methyl-2-pyrrolidone (NMP), dimethylimidazolidinone, N-methylcaprolactam, N-methylpropionamide, N,N-dimethylacetamide, dimethylsulfoxide, N,N-dimethylformamide (DMF), N,N-diethylformamide, N,N-diethylacetamide (DMAc), and γ-butyrolactone (GBL).

Examples of solvents other than solvents described above, for the purpose of improving coating properties or the like includes alkyl lactates, 3-methyl-3-methoxybutanol, tetralin, isophorone, ethylene glycol monoalkyl ethers such as ethylene glycol monobutyl ether (BCS), diethylene glycol monoalkyl ethers such as diethylene glycol monoethyl ether, ethylene glycol monoalkyl acetate and ethylene glycol phenyl acetate, triethylene glycolmonoalkyl ethers, propylene glycol monoalkyl ethers such as propylene glycol monobutyl ether, dialkyl malonates such as diethyl malonate, dipropylene glycol monoalkyl ethers such as dipropylene glycol monomethyl ether, and ester compounds of these glycol monoethers or the like. Of those, NMP, dimethylimidazolidinone, GBL, BCS, diethylene glycol monoethyl ether, propylene glycol monobutyl ether, dipropylene glycol monomethyl ether, and the like can be particularly preferably used as the solvent.

The solvent in the material solution for a retardation film has only to be incorporated so that the concentration of solid matter in the material solution for a retardation film may be a proper value in accordance with any one of the following various application methods. In ordinary cases, the content of the solvent in the material solution for a retardation film is preferably such an amount that the concentration of the solid matter in the material solution for a retardation film is 0.1 to 30 wt % from the viewpoint of the suppression of unevenness, a pinhole, or the like at the time of application. The content is more preferably such an amount that the concentration is 1 to 20 wt %.

The liquid crystalline polyimide film is obtained by: irradiating a coating film, which is obtained by applying the above-mentioned material solution for a retardation film to a substrate, with light in an arbitrary polarization state to impart anisotropy to the alignment a polyamic acid having the photoreactive group; heating the coating film to the liquid crystal temperature range of the coating film after the irradiation to form (bake) a film of the liquid crystalline polyimide through the dehydration of the polyamic acid; and expressing and enhancing the optical anisotropy of the formed film.

In this case, the liquid crystalline polyimide film is preferably produced by the following procedure from the viewpoint of the expression of sufficient optical anisotropy:

(1) the material solution for a retardation film is applied onto the substrate by, for example, a brush coating method, an immersion method, a spinner method, a spray method, a printing method, or an inkjet method;

(2) the coating film formed on the substrate is heated at 50 to 120° C., preferably 80 to 100° C. so that the solvent may be evaporated;

(3) the coating film is irradiated with the light in an arbitrary polarization state so that the polyamic acid in the coating film may be aligned; and (4) the coating film in which the polyamic acid has been aligned is heated at 150 to 300° C., preferably 180 to 250° C. so as to be imidated and to be caused to express a liquid crystal phase.

When the liquid crystalline polyimide film is produced, linearly polarized light is suitably used for the alignment of the polyamic acid. For example, when the photoreactive group is azobenzene, the major axis of the molecular structure of azobenzene is aligned by irradiation with the linearly polarized light in a direction vertical to the polarization direction. The linearly polarized light is not particularly limited as long as the light can align the polyamic acid in the coating film. In the coating film, the polyamic acid can be aligned by low-energy photoirradiation. In view of the foregoing, the dose of the linearly polarized light in an optical alignment treatment for the polyamic acid is preferably less than 10 J/cm$^2$. In addition, the linearly polarized light preferably has a wavelength of 300 to 400 nm. It should be noted that a retardation film whose optical axis is horizontal to the substrate is obtained via the same mechanism under the same production conditions with a polyamic acid obtained from the diamine compound having a photoreactive group (I-1), (I-2), (I-3), (II-1), (II-2), (II-3), (III-1), (IV-1), (IV-2), (IV-3), (V-1), (VI-1), (VI-2), (VI-3), (VI-4), (VI-5), or (VI-6), or from the acid anhydride (IV-4) or (VI-8) as well.

Such production steps are substantially the same as production steps for a conventional optical alignment layer based on an aligning agent. Although the conventional optical alignment layer based on the aligning agent has a function as an alignment layer of aligning a liquid crystal material typified by a polymerizable liquid crystal material, the film hardly obtains characteristics as a retardation film such as a retardation in a sufficient fashion. In contrast, the liquid crystalline polyimide having a photoreactive group largely differs from the conventional aligning agent in the following point. When the polyimide itself is aligned, sufficient characteristics as a retardation film as well as a function as an alignment layer as in the conventional optical alignment layer are obtained.

<Retardation Film Formed of Material Except Liquid Crystalline Polyimide Having Photoreactive Group>

The liquid crystal display device in the present invention may include a retardation film formed of a material except the liquid crystalline polyimide having a photoreactive group as well as the retardation film of the positive A-plate formed of the liquid crystalline polyimide having a photoreactive group.

First, definitions concerning the retardation film in the present invention are described.

(Refractive Indices in Three Axial Directions of Retardation Film)

First, the anisotropy of the refractive index of the retardation film is described with an orthogonal coordinate system with reference to FIG. 1. When axes parallel to the plane of the retardation film and perpendicular to each other are defined as an x-axis and a y-axis, and an axis parallel to the normal of the plane of the retardation film is defined as a z-axis, the refractive index of the retardation film can be resolved into directions parallel to the respective axes. Refractive indices as a result of the resolution corresponding to the respective x, y, and z-axes are represented by nx, ny, and nz, respectively, and the thickness of the retardation film is represented by d. Further, in the present invention, the relationship of nx>ny is satisfied when n×ny. In this case, a retardation (Re) in the plane of the retardation film (the direction parallel to the plane of the retardation film) is represented by (nx−ny)×d, and a retardation (Rth) in the thickness direction of the retardation film (the normal direction of the plane of the retardation film) is represented by [{(nx+ny)/2}−nz]× d. In addition, (nx−nz)/(nx−ny) is defined as Nz. It should be noted that the birefringence Δn of the retardation film of the positive A-plate formed of the liquid crystalline polyimide having a photoreactive group is represented by nx−ny.

(Axial Angles of Retardation Film and Polarizer)

Figure 2:
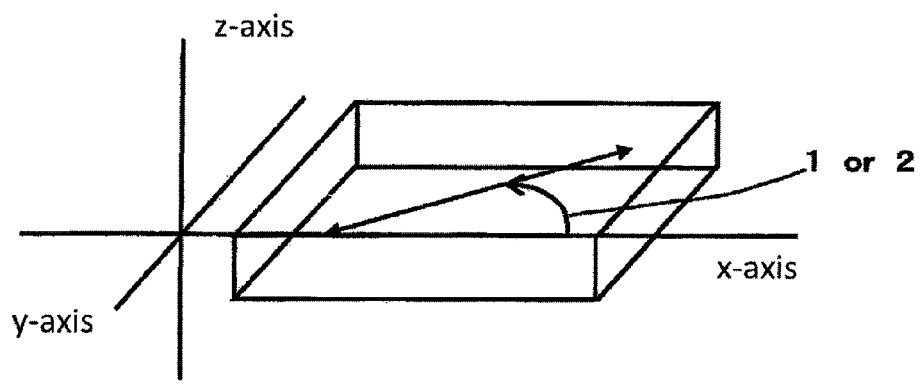
FIG. 2 is a view for illustrating definition concerning the axial angle of the optical axis of the retardation film or of the absorption axis of a polarizer.

Next, the axial angles of the optical axis of the retardation film and the absorption axis of a polarizer are defined. X-, Y-, and Z-axes are axes for representing the spatial placements of a liquid crystal display device, and a retardation film and a polarizer to be mounted on the liquid crystal display device including an observer. Therefore, the X-, Y-, and Z-axes can be arbitrarily set depending on the construction of the liquid crystal display device. In the present invention, the X-axis and the Y-axis correspond to the axes of an XY plane as a plane parallel to the film plane of the retardation film or of the polarizer, and an axis parallel to the normal of the film plane of the retardation film or of the polarizer is the Z-axis. As the screen (image display part) of the liquid crystal display device is generally a horizontal rectangle, the X-axis in the present invention is an axis parallel to the long side of the screen unless otherwise stated. When the retardation film is an A-plate to be described later, an x-axis as its optical axis exists in the XY plane, and as illustrated in FIG. 2, an axial angle 1 of the optical axis is represented as an angle formed between the x-axis and the X-axis, and is displayed so as to increase positively counterclockwise. In addition, in the case where the retardation film is a C-plate to be described later, the z-axis as its optical axis is parallel to the Z-axis. An axial angle 2 of the polarizer is represented as an angle formed between the absorption axis of the polarizer and the X-axis, and is displayed so as to increase positively counterclockwise.

Figure 3:
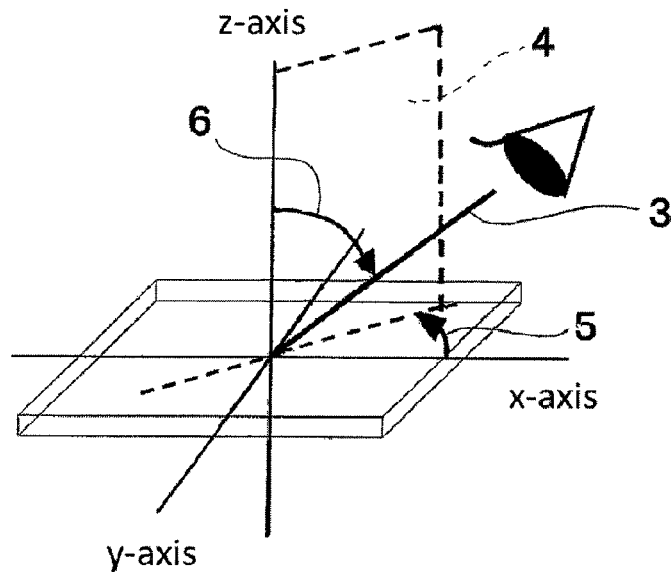
FIG. 3 is a view for illustrating definition concerning an angle formed between the direction of the line of sight of an observer and a liquid crystal display device when the observer observes the liquid crystal display device.

Further, in the observation of the liquid crystal display device, as illustrated in FIG. 3, a plane including the observation direction 3 of an observer (orientation of his or her line of sight) and the Z-axis is referred to as "incidence plane 4," an angle formed between the X-axis and the incidence plane 4 is referred to as "azimuth angle 5," and an angle formed between the observation direction of the observer and the Z-axis in the incidence plane 4 is referred to as "polar angle 6." The azimuth angle 5 is displayed so as to increase positively counterclockwise from the X-axis. The polar angle 6 is displayed so as to increase positively clockwise from the Z-axis. It should be noted that the viewing angle is an angle formed between an observation direction when the screen of the liquid crystal display device is observed and the screen, and can be represented by an azimuth angle 5 and a polar angle 6.

Retardation films are classified depending on a difference in magnitude correlation among the refractive indices nx, ny, and nz in the three axial directions illustrated in FIG. 1.

(1) Positive A-Plate

The positive A-plate has a relationship of nx>ny=nz among the refractive indices in the three axial directions. The plate shows positive uniaxiality, and may be represented as a retardation film whose optical axis is parallel to the thin-film surface of the retardation film. The plate is obtained by stretching a transparent resin whose intrinsic birefringence ratio is positive such as a cyclic olefin-based resin or a modified polycarbonate-based resin under a specific condition. Alternatively, the plate is obtained by forming and immobilizing, on a transparent base material, homogeneous alignment in which the directors of a liquid crystalline material having a rod-shaped mesogen skeleton are uniform. An example of the horizontal alignment of a polymerizable liquid crystal material having a rod-shaped mesogen skeleton is described in Japanese Patent Application Laid-open No. 2006-307150 or the like.

(2) Negative C-Plate

The negative C-plate has a relationship of nx=ny>nz among the refractive indices in the three axial directions. The plate shows negative uniaxiality, and may be represented as a retardation film whose optical axis coincides with the normal direction of the thin-film surface of the retardation film. The plate is obtained by stretching a transparent resin whose intrinsic birefringence ratio is positive such as a cyclic olefin-based resin, a polycarbonate-based resin, a cellulose-based resin, an acrylic resin, a polyamideimide-based resin, a polyether ether ketone-based resin, or a polyimide-based resin under a specific condition. Alternatively, when the thin film is molded by a solvent casting method, the plate is obtained by spontaneous alignment of molecules in the evaporation process of the solvent. In addition, the plate is obtained by immobilizing, on a transparent base material, specific alignment of a liquid crystalline material having a mesogen skeleton of a specific shape as well. One type of such plate is obtained by the spiral alignment of a liquid crystalline material having a rod-shaped mesogen skeleton. In this case, it is postulated that a spiral axis is parallel to the normal direction of the surface of the transparent base material and that a helical pitch is less than 300 nm. An example of the spiral alignment of a polymerizable liquid crystal material having a rod-shaped mesogen skeleton is described in Japanese Patent Application Laid-open No. 2005-263778 or the like. Another type of such plate is obtained by immobilizing the homeotropic alignment of a liquid crystalline material having a disk-shaped mesogen skeleton. Alternatively, the plate is obtained by causing a liquid crystalline material having a rod-shaped mesogen skeleton to permeate a transparent resin to form homogeneous alignment having random directors.

(3) Positive C-Plate

The positive C-plate has a relationship of $nx=ny<nz$ among the refractive indices in the three axial directions. The plate shows positive uniaxiality, and may be represented as a retardation film whose optical axis coincides with the normal direction of the thin-film surface of the retardation film. The plate is obtained by stretching a resin whose intrinsic birefringence ratio is negative such as a polystyrene-based resin or an N-substituted maleimide copolymer under a specific condition. Alternatively, the plate is obtained by forming and immobilizing, on a transparent base material, the homeotropic alignment of a liquid crystalline material having a rod-shaped mesogen skeleton. An example of the homeotropic alignment of a polymerizable liquid crystal material having a rod-shaped mesogen skeleton is described in Japanese Patent Application Laid-open No. 2006-188662 or the like.

(4) Negative A-Plate

The negative A-plate has a relationship of $nz=nx>ny$ among the refractive indices in the three axial directions. The plate shows negative uniaxiality, and may be represented as a retardation film whose optical axis is parallel to the thin-film surface of the retardation film. The plate is obtained by stretching a transparent resin whose intrinsic birefringence ratio is negative such as a polystyrene-based resin or an N-substituted maleimide copolymer under a specific condition. Alternatively, the plate is obtained by forming and immobilizing, on a transparent base material, homogeneous alignment in which the directors of a liquid crystalline material having a disk-shaped mesogen skeleton are uniform. In addition, it has been reported that the plate is obtained on the basis of the shape of supramolecular packing by disk-shaped molecules or rectangular molecules to be expressed in a lyotropic phase and its alignment mode.

(5) Biaxial Plate (I)

The biaxial plate (I) has a relationship of $nx>ny>nz$ among the refractive indices in the three axial directions. The plate is obtained by stretching a resin whose intrinsic birefringence ratio is positive such as a cyclic olefin-based resin, a polycarbonate-based resin, a cellulose-based resin, an acrylic resin, a polyamideimide-based resin, a polyether ether ketone-based resin, or a polyimide-based resin under a specific condition. Alternatively, the plate is obtained by further stretching the negative C-plate obtained from a transparent resin described above. In addition, the plate is obtained by immobilizing a liquid crystalline material having a rod-shaped mesogen skeleton, the material being subjected to such spiral alignment that a helical pitch periodically changes in a spiral axis direction. More specifically, the plate is obtained by: forming, with a polymerizable cholesteric liquid crystal material containing a dichroic polymerization initiator, such alignment that the spiral axis is parallel to the normal direction of the surface of a transparent substrate and the helical pitch is less than 300 nm; and irradiating the alignment with polarized ultraviolet light. This is probably because of the following reason. A periodic concentration gradient is provided for the generation of a free radical in the spiral axis direction because the free radical is more easily generated as the extent to which the polarization direction of the ultraviolet light and a director of the dichroic polymerization initiator are parallel to each other enlarges. An example of the plate is described in Japanese Patent Translation Publication No. 2005-513241 or the like.

(6) Biaxial Plate (II)

The biaxial plate (II) has a relationship of $nx>nz>ny$ among the refractive indices in the three axial directions. The plate is obtained by stretching a cyclic olefin-based resin or the like under a special condition. The plate is described in Japanese Patent Application Laid-open No. 2006-72309 or the like. In addition, it has been reported that the plate is obtained on the basis of the shape of supramolecular packing by rectangular molecules to be expressed in a lyotropic phase and its alignment mode.

(7) Biaxial Plate (III)

The biaxial plate (III) has a relationship of $nz>nx>ny$ among the refractive indices in the three axial directions. The plate is obtained by stretching the above-mentioned transparent resin whose intrinsic birefringence ratio is negative under a specific condition.

Further, examples of the retardation films that cannot be classified depending on a difference in magnitude correlation among the refractive indices nx, ny, and nz in the three axial directions are given.

(8) Retardation Film Obtained from Tilt-Aligned Liquid Crystalline Material

The retardation film is a retardation film obtained by immobilizing a liquid crystalline material having a rod-shaped or disk-shaped mesogen skeleton on a transparent base material in which directors are tilted between directions horizontal and vertical to the plane of the substrate. When the tilt angles from the interface of the substrate to an air interface are constant, such alignment is referred to as "spray alignment," and when the tilt angles continuously change, such alignment is referred to as "hybrid alignment." An example of the tilt alignment of a polymerizable liquid crystal material having a rod-shaped mesogen skeleton is described in Japanese Patent Application Laid-open No. 2006-307150 or the like.

Given next is an example in which a film obtained by immobilizing a cholesteric liquid crystalline material having rod-shaped mesogen skeleton on a base material expresses a function as a specific retardation film by virtue of a relationship between a wavelength of interest and a helical pitch when a spiral axis in the film is parallel to the normal direction of the surface of the base material.

(9) Retardation Film (I) Obtained from Spirally Aligned Liquid Crystalline Material Selective Reflective Film When the wavelength of interest and the helical pitch are of the same order, irradiating the film with light results in the reflection of only one of left-handed circularly polarized light and right-handed circularly polarized light corresponding to the left and right orientations of distortion out of the components of the light including a wavelength corresponding to the product of the helical pitch and the average refractive index of the cholesteric liquid crystalline material.

(10) Retardation Film (II) Obtained from Spirally Aligned Liquid Crystalline Material Rotator When the helical pitch is longer than the wavelength of interest, the film expresses a function as a rotator. An example of the spiral alignment of a polymerizable liquid crystal material having a rod-shaped mesogen skeleton is described in Japanese Patent Application Laid-open No. 2005-171235 or the like.

Although any such retardation film can be placed at an arbitrary position in the liquid crystal display device of the present invention, particularly when a retardation film based on a liquid crystalline material is formed on a retardation film of a liquid crystalline polyimide having a photoreactive group, the retardation film of the liquid crystalline polyimide having a photoreactive group can be caused to function as an alignment layer for the liquid crystalline material. In addition, when the retardation film of the liquid crystalline polyimide having a photoreactive group is formed so as to be adjacent to the driving liquid crystal medium in the liquid crystal display device, the film can be caused to function as an alignment layer for the driving liquid crystal medium.

For example, when the photoreactive group is azobenzene, the major axis of the structure of a liquid crystal molecule is aligned in the major axis direction of azobenzene. In addition, as described in Japanese Patent Application Laid-open No. 2009-69493, the pretilt angle of the liquid crystal molecule can be controlled by: blending the material with a polyamic acid having a diamine having a specific structure; and irradiating the mixture with polarized ultraviolet light under a specific condition.

Further, the following is also useful for the purpose of adjusting the alignment of the liquid crystalline material typified by a polymerizable liquid crystal material or a driving liquid crystal medium. The surface of the retardation film based on the liquid crystalline polyimide having the photoreactive group is subjected to a rubbing treatment, or is irradiated with an electromagnetic wave such as ultraviolet light having a specific energy intensity. The rubbing treatment induces the rearrangement of the polyimide main chain in the outermost surface of the retardation film. In addition, irradiation with ultraviolet light having a short wavelength has been known to exert such an effect as described below. The surface energy is increased and the pretilt angle of a liquid crystal molecule is reduced.

It should be noted that when a surface treatment such as the rubbing treatment or the ultraviolet irradiation described in the foregoing is performed in the liquid crystalline polyimide film during the lamination of the liquid crystalline polyimide film and other retardation film based on a liquid crystalline material, the thickness of the liquid crystalline polyimide film is preferably 5 nm or more, more preferably 10 nm, still more preferably 30 nm from such a viewpoint that both of the following characteristics are sufficiently obtained: an optical characteristic based on the alignment of the liquid crystalline polyimide in the liquid crystalline polyimide film and an alignment characteristic for the liquid crystal molecule of the upper layer in the surface of the liquid crystalline polyimide film based on the surface treatment. However, the thickness of the liquid crystalline polyimide film is set to a thickness sufficiently large (for example, 50 nm or more) as compared with the thickness needed for the surface treatment in some cases from the viewpoint of the expression of a desired optical characteristic. In the liquid crystalline polyimide film having such large thickness, there is no need to secure a thickness for such surface treatment because an influence of the surface treatment on an optical characteristic of the liquid crystalline polyimide film is extremely small.

In addition, although an arbitrary plate obtained by means of the material and production method described in the foregoing is applicable to the negative C-plate in the present invention, an optically anisotropic layer in which the alignment of a cholesteric liquid crystal having a helical pitch of less than 200 nm is immobilized by crosslinking or polymerization is preferably applied from such viewpoints of the performance of an optical device, and the production of the retardation film and the optical device as described below. The layer can be thinned, eliminates the need for a stretching treatment for expressing optical anisotropy, and is excellent in heat resistance.

Further, although an arbitrary plate obtained by means of the material and production method described in the foregoing is applicable to the biaxial plate (I) out of the retardation films each showing biaxiality in the present invention, an optically anisotropic layer in which a periodic change is caused in a helical pitch in a spiral axis direction in the spiral alignment of a cholesteric liquid crystal having a helical pitch of less than 200 nm by irradiating the cholesteric liquid crystal with polarized ultraviolet light having an electric field vector in a direction vertical to a spiral axis, and the alignment of the liquid crystal is immobilized by crosslinking or polymerization is preferably applied from such viewpoints of the performance of an optical device, and the production of the retardation film and the optical device as described below. The layer can be thinned, eliminates the need for a stretching treatment for expressing optical anisotropy, and is excellent in heat resistance.

<Examples of Liquid Crystal Display Device>

The retardation film formed of the liquid crystalline polyimide having a photoreactive group of the present invention is applicable to optical compensation of a vertical alignment (VA) mode typified by, for example, multi-domain vertical alignment (MVA) or patterned vertical alignment (PVA), an in-plane switching (IPS) mode, or an isotropic switch panel (ISP) mode.

The liquid crystal display device of the present invention has the retardation film described in the foregoing, and a driving liquid crystal layer selected from a VA driving liquid crystal layer, an IPS driving liquid crystal layer, and an ISP driving liquid crystal layer. In the present invention, the term "VA driving liquid crystal layer" means a liquid crystal layer in which a liquid crystal molecule is aligned in a direction vertical to a substrate when no electric field is applied, and the liquid crystal molecule is aligned in any other direction except the vertical direction when an electric field is applied (the liquid crystal molecule is gradually tilted from the vertical direction of the substrate to a direction horizontal thereto depending on the magnitude of a voltage to be applied). In addition, in the present invention, the term "IPS driving liquid crystal layer" means a liquid crystal layer in which a liquid crystal molecule is aligned in a first direction horizontal to the substrate when no electric field is applied (an angle of the liquid crystal molecule formed with respect to the X-axis at this time is represented by $\theta 1$), and the liquid crystal molecule is aligned in a second direction horizontal to the substrate when an electric field is applied (when an angle of the liquid crystal molecule formed with respect to the X-axis at this time is represented by $\theta 2$, the relationship of $\theta 1 \neq \theta 2$ is satisfied, and the difference between the $\theta 2$ and the $\theta 1$ enlarges depending on the magnitude of a voltage to be applied). Further, in the present invention, the term "ISP driving liquid crystal layer" means a liquid crystal layer that is optically isotropic when no electric field is applied, and expresses optical anisotropy when an electric field is applied. A liquid crystal layer that serves any such function as described in the foregoing can be used as the driving liquid crystal layer.

In the liquid crystal display device of the present invention, the liquid crystal display device typically has one polarizer or two polarizers placed so that the driving liquid crystal layer may be interposed therebetween, and the optical compensator is provided between the polarizer and the driving liquid crystal layer from such a viewpoint that the polarization state of light emitted from a light source particularly during a time period commencing on its passing of a polarizer on a light source side and ending on its arrival at a polarizer on an observer side is transformed. It should be noted that when two polarizers are used, the optical compensator may be provided between a first polarizer and the driving liquid crystal layer, or may be dividedly provided between the first polarizer and the driving liquid crystal layer, and between a second polarizer and the driving liquid crystal layer, respectively.

In addition, in the liquid crystal display device of the present invention, an ordinary constituent to be provided for the liquid crystal display device as well as the driving liquid crystal layer, the retardation film for optical compensation, and the polarizer can be used for an ordinary application. Examples of such constituent include: a backlight unit as a light source and a reflective plate; a protective layer for protecting the surface of a member or layer; a liquid crystal alignment layer for aligning a liquid crystal molecule in the driving liquid crystal layer; an electrode for driving a liquid crystal molecule in the driving liquid crystal layer; a color filter for displaying an image in color; an insulating film for electrically insulating a gap between layers or members in a laminating direction; a switching device for adjusting an applied voltage for each pixel; and an overcoat layer and a cell thickness-adjusting layer for planarization between members or layers in the laminating direction.

The optical compensator may be arbitrarily placed on a polarizer side (which may hereinafter be referred to as "out-cell") with respect to the substrate of the liquid crystal display device, or may be placed on a driving liquid crystal medium side (which may hereinafter be referred to as "in-cell") with respect thereto as long as the optical compensator is provided between the polarizer and the driving liquid crystal layer.

When part or the entirety of the retardation films in the optical compensator are each placed as an out-cell on the polarizer side with respect to the substrate of the liquid crystal display device, each retardation film to be placed is placed as an elliptically polarizer integrated with the polarizer by being attached to the liquid crystal display device. In addition, when part or the entirety of the retardation films in the optical compensator are each placed as an in-cell on the driving liquid crystal side with respect to the substrate of the liquid crystal display device, each retardation film to be placed, which may be formed on each of two substrates that form the liquid crystal display device, that is, an array substrate on which a TFT device is formed and an opposing substrate as another one, is preferably formed on the opposing substrate in consideration of a risk that occurs when a retardation film is formed because the array substrate is formed with a larger number of materials by more complicated production steps than those of the opposing substrate. As a color filter layer is typically formed on the opposing substrate in a color liquid crystal display device, the retardation film is placed in the liquid crystal display device by attaching a color filter substrate on which the retardation film is formed to the array substrate.

Next, a particularly preferred embodiment is specifically described.

<VA Mode and its Optical Compensation>

A liquid crystal display device having a driving liquid crystal medium interposed between two substrates each having an electrode, an alignment layer, and the like formed thereon in which a liquid crystal molecule is aligned substantially vertical to a substrate when no electric field is applied is referred to as "vertical alignment (abbreviated as "VA") mode" after the vertically aligned liquid crystal molecule, and the term is hereinafter used in the document. In addition, in the VA mode, liquid crystal molecules are each tilted from the normal direction of the substrate so as to be aligned substantially parallel to the plane of the substrate at the time of the application of a voltage. At this time, the major axes of the liquid crystal molecules are ideally tilted in all directions from the viewpoint of symmetry, and hence different technologies such as MVA, continuous pinwheel alignment (CPA), and PVA have been developed and adopted in order that a plurality of domains in which the liquid crystal molecules are tilted in different directions may be formed (multidomain). The present invention is useful for a multidomained VA mode as well, and such modes are collectively referred to as "VA mode" in the present invention.

Next, Table 3 shows a preferred array of the retardation film, the polarizer, and the driving liquid crystal layer out of the optical components in the liquid crystal display device of the present invention. It should be noted that numbers in Table 3 each represent the axial angle of the optical axis of the retardation film (positive A-plate (p A-plate)), the axial angle of the nx of the biaxial plate (Biaxial (I)), or the axial angle of the absorption axis of the polarizer. Those numbers comply with the definition in each of FIGS. 1 and 2.

TABLE 3

| | Observer (or light source) side | | | Construction of optical component | | | Light source (or observer) side |
|---|---|---|---|---|---|---|---|
| (1) | Polarizer 0 | p A-plate 90 | p A-plate 0 | Driving liquid crystal medium (VA) | p A-plate 0 | | Polarizer 90 |
| (2) | Polarizer 0 | p A-plate 90 | p A-plate 0 | Driving liquid crystal medium (VA) | p A-plate 0 | p A-plate 90 | Polarizer 90 |
| (3) | Polarizer 0 | p A-plate 90 | p A-plate 0 | Driving liquid crystal medium (VA) | p A-plate 90 | p A-plate 0 | Polarizer 90 |
| (4) | Polarizer 0 | n C-plate | | Driving liquid crystal medium (VA) | p A-plate 0 | | Polarizer 90 |
| (5) | Polarizer 0 | p A-plate 90 | n C-plate | Driving liquid crystal medium (VA) | n C-plate | p A-plate 0 | Polarizer 90 |
| (6) | Polarizer 0 | n C-plate | p A-plate 90 | Driving liquid crystal medium (VA) | | | Polarizer 90 |
| (7) | Polarizer 0 | Biaxial (I) 90 | | Driving liquid crystal medium (VA) | p A-plate 0 | | Polarizer 90 |
| (8) | Polarizer 0 | p A-plate 90 | Biaxial (I) 90 | Driving liquid crystal medium (VA) | | | Polarizer 90 |
| (31) | Polarizer 0 | p A-plate 90 | n C-plate | Driving liquid crystal medium (VA) | | | Polarizer 90 |
| (32) | Polarizer 0 | Biaxial (I) 90 | p A-plate 90 | Driving liquid crystal medium (VA) | | | Polarizer 90 |

A preferred example in the present invention is such an array that at least two layers of positive A-plates (each represented as "p A-plate" in Table 3) each formed of a liquid crystalline polyimide having a photoreactive group exist and two layers out of the layers are provided between the driving liquid crystal medium and one polarizer so that their optical axes may be perpendicular to each other. In Table 3, the item (1), (2), or (3) corresponds to the array.

Another preferred example in the present invention is such an array that one or two or more layers of positive A-plates (each represented as "p A-plate" in Table 3) each formed of a liquid crystalline polyimide having a photoreactive group and one or two or more layers of negative C-plates (each represented as "n C-plate" in Table 3) are provided. In Table 3, the item (4), (5), (6), or (31) corresponds to the array.

It is particularly preferred that the $Re_I$ of each p A-plate in light having a wavelength of 550 nm be between 10 nm and 200 nm, and the $Rth_{II}$ of one layer of an n C-plate, or total $Rth_{II}$ of two layers of n C-plates, in the light having a wavelength of 550 nm be smaller than the $Rth_{LC}$ of the driving liquid crystal layer in the light having a wavelength of 550 nm from the viewpoint of the suppression of a transmittance in an oblique direction in a black display state in which no voltage is applied to the driving liquid crystal layer. Here, the $Re_I$ of the p A-plate and the $Rth_{II}$ of the n C-plate are represented by "$Re_I=(nx_I-ny_I)\cdot d_I$" and "$Rth_{II}=(nx_{II}+ny_{II})/2-nz_{II})\cdot d_{II}$," respectively, in accordance with the foregoing definition, $nx_I$ and $ny_I$ represent two components parallel to a thin-film surface out of the three-dimensional refractive indices of the retardation film (I), and $d_I$ represents its thickness, $nx_{II}$, $ny_{II}$, $nz_{II}$, and $d_{II}$ represent the three-dimensional refractive indices and thickness of the retardation film (II), respectively, nx and ny represent refractive indices in directions parallel to a thin-film surface, and nz represents a refractive index in the normal direction of the thin-film surface. Here, the relationships of $nx_I > ny_I$ and $nx_{II} = ny_{II}$ are satisfied. In addition, the $Rth_{LC}$ of the driving liquid crystal medium is a numerical value obtained in accordance with definition "$Rth_{LC}=(ne-no)\cdot d_{LC}$" when the ordinary light and extraordinary light refractive indices, and thickness of the driving liquid crystal medium are represented by no, ne, and $d_{LC}$, respectively.

Still another preferred example in the present invention is such an array that one layer of a positive A-plate (represented as "p A-plate" in Table 3) formed of a liquid crystalline polyimide having a photoreactive group and one layer of the above-mentioned biaxial plate (I) (represented as "Biaxial (I)" in Table 3) are provided. In Table 3, the item (7), (8), or (32) corresponds to the array.

In Table 3, the retardation films of the p A-plate, n C-plate, and Biaxial (I) may each be arbitrarily formed on the polarizer side (out-cell) with respect to the substrate of the liquid crystal display device, or may each be formed on the driving liquid crystal medium side (in-cell) with respect thereto as long as the retardation films are each provided between the polarizer and the driving liquid crystal medium.

Further, the two polarizers placed on both sides of the driving liquid crystal medium are each provided with protective layers on both of its sides so that the polarizer may be interposed therebetween, and these protective layers including a protective layer on the driving liquid crystal medium side are each provided with optical anisotropy corresponding to, for example, the negative C-plate or biaxial plate (I) described above in some cases, provided that these layers are discriminated from the retardation films of the p A-plate, n C-plate, and Biaxial (I) shown in Table 3.

In addition, in the array of the item (5) or (8) of Table 3, in the case where the retardation film of the n C-plate or Biaxial (I) is formed of a liquid crystalline material and is formed on the retardation film (p A-plate) formed of the liquid crystalline polyimide having a photoreactive group, the retardation film formed of the liquid crystalline polyimide having a photoreactive group can be utilized as an alignment layer for the liquid crystalline material that forms the retardation film of the C-plate or Biaxial (I) as well. In this case, it is also useful to subject the surface of the retardation film based on the liquid crystalline polyimide having a photoreactive group to a rubbing treatment or ultraviolet irradiation for the purpose of adjusting the alignment of the liquid crystalline material. The utilization of the positive A-plate formed of the liquid crystalline polyimide having a photoreactive group as an alignment layer for the liquid crystalline material as described above is preferred from the viewpoint of the curtailment of the numbers of members and steps for the production of the retardation films and the liquid crystal display device because the utilization can omit any production step for the alignment layer for the liquid crystalline material.

(IPS Mode and its Optical Compensation)

In a driving liquid crystal medium interposed between two substrates each having an electrode, an alignment layer, and the like formed thereon, a liquid crystal molecule is aligned substantially horizontal to a substrate when no electric field is applied, and the liquid crystal molecule rotates while keeping itself parallel to the substrate when an electric field parallel to the substrate is applied. When polarizers whose absorption axes are perpendicular to each other are placed on both sides with the driving liquid crystal medium interposed therebetween and a voltage is applied, the quantity in which light entered through one of the polarizers can be transmitted through the other polarizer changes depending on an angle formed between the director of the liquid crystal molecule of the driving liquid crystal layer and the absorption axis of each polarizer. A liquid crystal display device employing such principle is referred to as "in-plane switching mode (abbreviated as "IPS mode")," and the term is hereinafter used in the document. The liquid crystal display device employing the principle has been improved in terms of, for example, the structure of an electrode, and S-IPS, AS-IPS, FSS, A-FFS, U-FFS, and the like have been developed and adopted. The present invention is useful for all of those modes, and those modes are collectively referred to as "IPS mode" in the present invention.

Next, Table 4 shows a preferred array of the retardation film, the polarizer, and the driving liquid crystal medium out of the optical components in the liquid crystal display device of the present invention. It should be noted that numbers in Table 4 each represent the axial angle of the optical axis of the retardation film (positive A-plate (p A-plate)), the axial angle of the absorption axis of the polarizer, or the axial angle of the slow axis of the driving liquid crystal medium when no voltage is applied. Those numbers comply with the definition in each of FIGS. 1 and 2.

TABLE 4

| | Observer (or light source) side | | | Construction of optical component | Light source (or observer) side |
|---|---|---|---|---|---|
| (9) | Polarizer | p A-plate | p C-plate | Driving liquid crystal medium (IPS) | Polarizer |
| | 90 | 0 | 0 | 0 | 0 |
| (10) | Polarizer | p C-plate | p A-plate | Driving liquid crystal medium (IPS) | Polarizer |
| | 90 | 0 | 0 | 0 | 0 |

TABLE 4-continued

| | Observer (or light source) side | | Construction of optical component | | | Light source (or observer) side |
|---|---|---|---|---|---|---|
| (11) | Polarizer | p C-plate | p A-plate | Driving liquid crystal medium (IPS) | | Polarizer |
| | 90 | 90 | 0 | | | 0 |
| (12) | Polarizer | p C-plate | p A-plate | Driving liquid crystal medium (IPS) | | Polarizer |
| | 0 | 90 | 0 | | | 90 |
| (13) | Polarizer | | p C-plate | Driving liquid crystal medium (IPS) | p A-plate | Polarizer |
| | 90 | | 0 | | 0 | 0 |
| (14) | Polarizer | p C-plate | p A-plate | Driving liquid crystal medium (IPS) | p C-plate | Polarizer |
| | 90 | 90 | 0 | | 0 | 0 |
| (15) | Polarizer | p C-plate | p A-plate | Driving liquid crystal medium (IPS) | p A-plate | Polarizer |
| | 90 | 90 | 0 | | 0 | 0 |
| (16) | Polarizer | p C-plate | p A-plate | Driving liquid crystal medium (IPS) | p A-plate | Polarizer |
| | 90 | 0 | 0 | | 0 | 0 |

A preferred example in the present invention is such an array that one or two or more layers of positive A-plates (each represented as "p A-plate" in Table 4) each formed of a liquid crystalline polyimide having a photoreactive group and one or two or more layers of positive C-plates (each represented as "p C-plate" in Table 4) are provided. The items (9) to (16) of Table 4 each correspond to such array.

It is particularly preferred that the $Re_I$ of each p A-plate in light having a wavelength of 550 nm be between 10 nm and 200 nm, and the $Rth_{III}$ of each p C-plate in the light having a wavelength of 550 nm be between −200 nm and −10 nm from the viewpoint of the suppression of a transmittance in an oblique direction in a black display state in which no voltage is applied to the driving liquid crystal layer. Here, the $Re_I$ of the p A-plate and the $Rth_{III}$ of the p C-plate are represented by "$Re_I = (nx_I - ny_I) \cdot d_I$" and "$Rth_{III} = ((nx_{III} + ny_{III})/2 - nz_{III}) \cdot d_{III}$" respectively, in accordance with the foregoing definition, $nx_I$, and $d_I$ represent the three-dimensional refractive indices and thickness of the positive A-plate, respectively, $nx_{III}$, $ny_{III}$, $nz_{III}$, and $d_{III}$ represent the three-dimensional refractive indices and thickness of the positive C-plate, respectively, nx and ny represent refractive indices in directions parallel to a thin-film surface, and nz represents a refractive index in the normal direction of the thin-film surface. Here, the relationships of $nx_I > ny_I$ and $nx_{III} = ny_{III}$ are satisfied.

In Table 4, the retardation films of the p A-plate and the p C-plate may each be arbitrarily formed on the polarizer side (out-cell) with respect to the substrate of the liquid crystal panel, or may each be formed on the driving liquid crystal medium side (in-cell) with respect thereto as long as the retardation films are each provided between the polarizer and the driving liquid crystal medium.

Further, the two polarizers placed on both sides of the driving liquid crystal medium are each provided with protective layers on both of its sides so that the polarizer may be interposed therebetween, and these protective layers including a protective layer on the driving liquid crystal medium side are each provided with optical anisotropy corresponding to, for example, the negative C-plate or biaxial plate (I) described above in some cases, provided that these layers are discriminated from the retardation films of the p A-plate and the p C-plate shown in Table 4.

In addition, in each of the arrays of the items (10) to (16) of Table 4, the retardation film (p A-plate) formed of the liquid crystalline polyimide having a photoreactive group can be formed so as to be adjacent to the driving liquid crystal medium. In this case, the retardation film formed of the liquid crystalline polyimide having a photoreactive group can be caused to function as an alignment layer for the driving liquid crystal medium as well.

In the case where the axial angle of the optical axis of the p A-plate is 0° in Table 4, the anchoring energy of the retardation film based on the liquid crystalline polyimide having a photoreactive group allows the direction (director) in which the driving liquid crystal medium is aligned to coincide with a desired angle. In addition, in the case where the axial angle of the optical axis of the p A-plate is 90°, the anchoring energy of the retardation film causes the direction (director) in which the driving liquid crystal medium is aligned to shift from the desired angle by 90°. In this case, it is useful to readjust the anchoring energy so that a desired director of the driving liquid crystal layer medium may be obtained by subjecting the surface of the retardation film based on the liquid crystalline polyimide having a photoreactive group to a rubbing treatment or the like.

(ISP Mode and its Optical Compensation)

A liquid crystal display device using an optically isotropic liquid crystal phase typified by a blue phase has been researched. In such liquid crystal display device, a driving liquid crystal medium interposed between two substrates each having an electrode, an alignment layer, and the like formed thereon shows optical isotropy when no electric field is applied, and expresses a birefringence when a voltage is applied. When polarizers whose absorption axes are perpendicular to each other are placed on both sides with the driving liquid crystal medium interposed therebetween and a voltage is applied, the magnitude of the birefringence expressed by the driving liquid crystal medium changes depending on an applied voltage, and then the quantity in which light entered through one of the polarizers can be transmitted through the other polarizer changes. A liquid crystal display device employing such principle is referred to as "isotropic switch panel mode (abbreviated as "ISP mode")," and the term is hereinafter used in the present invention.

Next, Table 5 shows a preferred array of the retardation film, the polarizer, and the driving liquid crystal layer out of the optical components in the liquid crystal display device of the present invention. It should be noted that numbers in Table 5 each represent the axial angle of the optical axis of the positive A-plate or the axial angle of the absorption axis of the polarizer. Those numbers comply with the definition in each of FIGS. 1 and 2.

TABLE 5

| | Observer (or light source) side | | Construction of optical component | | | | Light source (or observer) side |
|---|---|---|---|---|---|---|---|
| (17) | Polarizer 90 | p A-plate 0 | p C-plate | Driving liquid crystal medium (ISP) | | | Polarizer 0 |
| (18) | Polarizer 90 | | p A-plate 0 | Driving liquid crystal medium (ISP) | p C-plate | | Polarizer 0 |
| (19) | Polarizer 90 | | p C-plate | Driving liquid crystal medium (ISP) | p A-plate 90 | | Polarizer 0 |
| (20) | Polarizer 90 | p C-plate | p A-plate 90 | Driving liquid crystal medium (ISP) | p A-plate 90 | | Polarizer 0 |
| (21) | Polarizer 90 | p C-plate | p A-plate 90 | Driving liquid crystal medium (ISP) | p A-plate 0 | p C-plate | Polarizer 0 |

A preferred example in the present invention is such an array that one or two or more layers of positive A-plates (each represented as "p A-plate" in Table 5) each formed of a liquid crystalline polyimide having a photoreactive group and one or two or more layers of positive C-plates (each represented as "p C-plate" in Table 5) are provided. The items (17) to (21) of Table 5 each correspond to such array. It is particularly preferred that the $Re_I$ of each p A-plate in light having a wavelength of 550 nm be between 10 nm and 200 nm, and the $Rth_{III}$ of each p C-plate in the light having a wavelength of 550 nm be between −200 nm and −10 nm from the viewpoint of the suppression of a transmittance in an oblique direction in a black display state in which no voltage is applied to the driving liquid crystal layer. Here, the $Re_I$ of the p A-plate and the $Rth_{III}$ of the n C-plate are the same as the $Re_I$ and the $Rth_{III}$ in the IPS mode described in the foregoing, and are values obtained in accordance with the definition illustrated in FIG. 1.

In Table 5, the retardation films of the p A-plate and the p C-plate may each be arbitrarily formed on the polarizer side (out-cell) with respect to the substrate of the liquid crystal panel, or may each be formed on the driving liquid crystal medium side (in-cell) with respect thereto as long as the retardation films are each provided between the polarizer and the driving liquid crystal medium.

Further, the two polarizers placed on both sides of the driving liquid crystal medium are each provided with protective layers on both of its sides so that the polarizer may be interposed therebetween, and these protective layers including a protective layer on the driving liquid crystal medium side are each provided with optical anisotropy corresponding to, for example, the negative C-plate or biaxial plate (I) described above in some cases, provided that these layers are discriminated from the retardation films of the p A-plate and the p C-plate shown in Table 5.

In addition, in each of the arrays of the items (18) to (21) of Table 5, the retardation film (p A-plate) formed of the liquid crystalline polyimide having a photoreactive group can be formed so as to be adjacent to the driving liquid crystal medium. In this case, the retardation film formed of the liquid crystalline polyimide having a photoreactive group can be caused to function as an alignment layer for the driving liquid crystal medium as well.

When the anchoring energy of the retardation film based on the liquid crystalline polyimide having a photoreactive group does not allow the direction (director) in which the driving liquid crystal layer is aligned to coincide with a desired angle, it is useful to readjust the anchoring energy so that a desired director of the driving liquid crystal medium may be obtained by subjecting the surface of the retardation film based on the liquid crystalline polyimide having a photoreactive group to a rubbing treatment or the like.

EXAMPLES

Hereinafter, examples of the present invention are described. The present invention is not limited only to the following examples.

First, evaluation methods for a material and a retardation film employed in the examples are described.

<Viscosity>

The viscosity of a polyamic acid solution was measured with a rotational viscometer (TV-22L manufactured by Toki Sangyo Co., Ltd.).

<Weight-Average Molecular Weight (Mw)>

The weight-average molecular weight (Mw) of the polyamic acid was measured by employing gel permeation chromatography (GPC) with DMF containing 0.6 wt % of phosphoric acid as an eluent and polystyrene as a standard solution at a column temperature of 50° C. A gel permeation chromatograph system manufactured by JASCO Corporation (HPLC pump: PU-2080, column oven: 865-CO, ultraviolet-visible light detector: UV-2075, differential refractometer detector: RI-2031) was used in GPC, and a Shodex GF-7M HQ (manufactured by Showa Denko K.K.) was used as a column.

<Thickness of Retardation Film>

The thickness of a retardation film was determined by: shaving part of the retardation film from a substrate on which the retardation film was formed; and measuring the step height with a surface measurement profiler (Alpha-Step IQ/manufactured by KLA-Tencor Corporation).

<Retardation of Retardation Film>

The retardation of the retardation film was determined with an ellipsometer (OptiPro/manufactured by SHINTECH, Inc.).

Example 1

Synthesis of Compound (VII-4-1)

[Chem. 10]

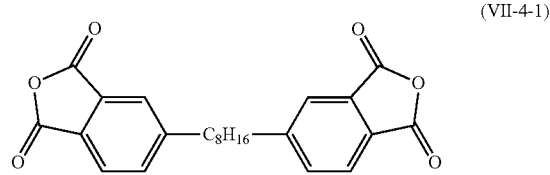

(VII-4-1)

A mixture of 4-bromophthalic acid diethyl ester (50 g, 166 mmol), 1,7-octadiyne (8.7 g, 82 mmol), dichlorotriphenylphosphinepalladium(II) (290 mg, 0.41 mmol), and copper iodide (158 mmol, 0.83 mmol) was refluxed in a stream of nitrogen in triethylamine (200 mL) for 4 hours. After the completion of the reaction, toluene (500 mL) and pure water (500 mL) were added to the resultant reaction mixture to perform extraction. The organic phase was washed with pure water (300 mL) once, and was then dried with anhydrous magnesium sulfate. The organic phase after the drying was filtrated and the solvent was removed by distillation under reduced pressure. Thus, 1,4-bis(3,4-dicarboxyphenyl)ethynylbutane tetraethyl ester as a target product was obtained in an amount of 42 g in 95% yield. The compound was directly used in the next reaction without being purified.

5% Pd/C (2.1 g) was added to 1,4-bis(3,4-dicarboxyphenyl)ethynylbutane tetraethyl ester (42 g, 77 mmol), and then the mixture was subjected to a hydrogenation reaction in a mixed solvent of toluene and ethanol (300 mL/300 mL) at a hydrogen pressure of 720 MPa. After the completion of the reaction, the catalyst was separated by filtration and the solvent was removed by distillation under reduced pressure. The remainder was purified by column chromatography (silica gel/toluene:ethyl acetate=10:1 v/v). Thus, 1,8-bis(3,4-dicarboxyphenyl)octane tetraethyl ester as a target was obtained in an amount of 43 g in 100% yield.

1,8-Bis(3,4-dicarboxyphenyl)octane tetraethyl ester (43 g, 77 mmol) was dissolved in ethanol (250 mL). A 5.7% aqueous solution of sodium hydroxide (250 mL) was added to the solution, and then the mixture was refluxed for 2 hours. After the reaction, the solvent was removed by distillation under reduced pressure, and then concentrated hydrochloric acid was added to the resultant condensate until the pH of the resultant mixture became 1. The resultant precipitate was filtrated, and was then washed with pure water (200 mL) three times. The resultant crystal was dried under reduced pressure. Thus, 1,8-bis(3,4-dicarboxyphenyl)octane was obtained in an amount of 31 g in 90% yield.

Acetic anhydride (50 mL) was added to 1,8-bis(3,4-dicarboxyphenyl)octane (10 g, 23 mmol), and then the mixture was refluxed for 2 hours. After acetic anhydride had been removed by distillation under reduced pressure, cyclohexane (50 mL) was added to the remainder and the resultant precipitate was filtrated. The resultant crystal was dried under reduced pressure. Thus, Compound (VII-4-1) having a melting point of 109.7 to 111.2° C. was obtained in an amount of 9.2 g in 97% yield. The resultant compound was subjected to $^1$H-NMR measurement. As a result, the following spectrum was obtained, and hence it was confirmed that the target product was synthesized. $^1$H-NMR (500 Hz, CDCl$_3$); δ(ppm) 7.92 (d, 4H, J=7.80 Hz), 7.70 (d, 4H, J=8.1 Hz), 2.82 (t, 4H, J=7.65 Hz), 1.3-1.7 (m, 12H)

Compound (VI-1) (0.1661 g, 0.7827 mmol) was dissolved in N-methyl-2-pyrrolidone (NMP, 3.0 g), and then Compound (VII-4-1) (0.3182 g, 0.7829 mmol) was added to the solution while the temperature of the solution was kept at room temperature or less. After the mixture had been stirred overnight, NMP (3.5 g) and ethylene glycol monobutyl ether (BSC, 3.0 g) were added to the mixture. Thus, a polyamic acid solution (A-1) as a precursor of a liquid crystalline polyimide having a photoreactive group was obtained. The concentration of the polyamic acid in the solution (A-1) was about wt %, the solution (A-1) had a viscosity of 20.7 mPa·s, and the polyamic acid had a weight-average molecular weight of 58,000. Further, a liquid whose polyamic acid concentration was 3 wt % was prepared by diluting the solution with a mixture containing NMP and BSC at a weight ratio of 1/1. The liquid is defined as a polyamic acid solution (A-2).

[Chem. 11]

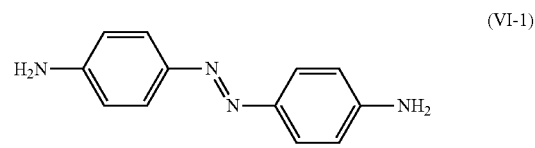

(VI-1)

<Production of Retardation Film 1 and Evaluation for its Optical Characteristics>

The solution (A-1) was applied to a glass substrate with a spinner (2,000 rpm, 15 seconds), and was then heated at 80° C. for 3 minutes so that the solvent was evaporated. After that, the resultant was irradiated with polarized ultraviolet light (illuminance: 9 mW/cm$^2$, irradiation energy intensity: 5 J/cm$^2$). The substrate that had been irradiated with the polarized ultraviolet light was subjected to a heat treatment in an oven at 230° C. for 15 minutes. Thus, a retardation film 1 having a thickness of 175 nm was obtained. The retardation Re of the retardation film 1 was measured to be 71 nm (λ=550 nm). Thus, it was confirmed that the retardation film 1 was a film based on a polyimide having liquid crystallinity obtained by heating and imidating a polyamic acid having a photoreactive group. In addition, the orientation of an optical axis in the retardation film 1 was substantially parallel to the direction of the absorption axis of the polarizer upon irradiation with the polarized ultraviolet light. Thus, it was confirmed that the control of the angle of the optical axis in the retardation film 1 was attained by the polarization state of ultraviolet light to be applied.

Example 2

Preparation of Polymerizable (Cholesteric) Liquid Crystal Composition Solution (B-1) for Obtaining Retardation Film Formed of Cholesteric Liquid Crystal Having Helical Pitch after Polymerization of Less than 200 nm A composition formed of 90 wt % of Compound (P-1) and 10 wt % of Compound (P-2) was defined as a (MIX1). A CPI-110P (San-Apro Ltd.) having a weight ratio of 0.030 was added to the (MIX1), and then cyclopentanone having a weight ratio of 2.333 was added to the mixture. Thus, a cyclopentanone solution (B-1) having a solute concentration of 30 wt % was obtained. It should be noted that Compound (P-1) was synthesized by a method described in Macromolecules, 1993, 26(6), 244. In addition, Compound (P-2) was synthesized by a method described in Japanese Patent Application Laid-open No. 2005-263778.

[Chem. 12]

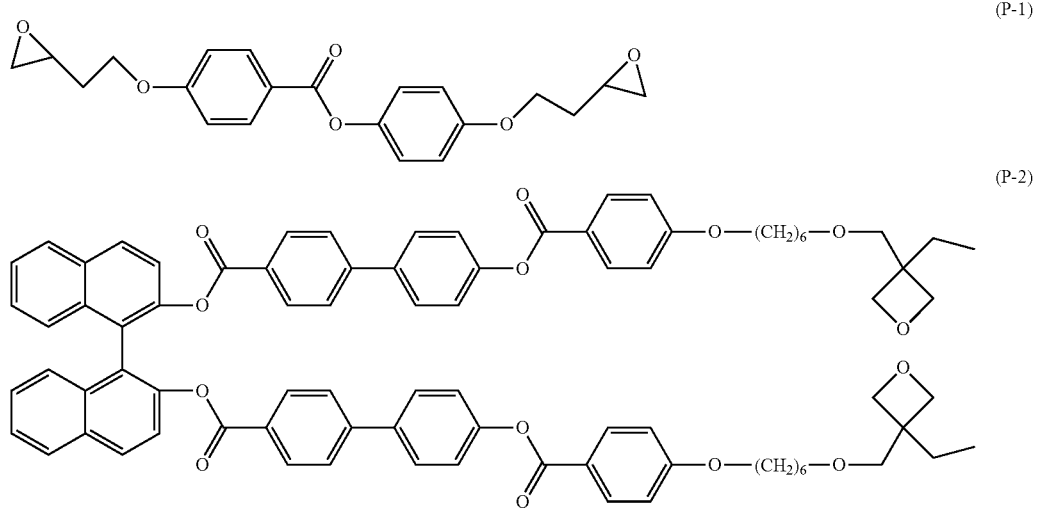

(P-1)

(P-2)

<Production of Retardation Film Formed of Cholesteric Liquid Crystal Having Helical Pitch of Less than 200 nm by Application of Polymerizable (Cholesteric) Liquid Crystal Composition Solution (B-1) onto Retardation Film (Retardation Film 1) Based on Liquid Crystalline Polyimide Having Photoreactive Group and its Polymerization>

The solution (B-1) was applied onto the retardation film 1 obtained in Example 1 with a spinner (1,800 rpm, 15 seconds). Further, the resultant was heated at 80° C. for 3 minutes so that the solvent was evaporated. After that, the resultant was irradiated with ultraviolet light (illuminance: 25 mW/cm$^2$, irradiation energy intensity: 0.75 J/cm$^2$) so that a retardation film having a thickness of about 1.2 μm was formed. The retardation film as a result of lamination is defined as a retardation film 2.

Figure 4:
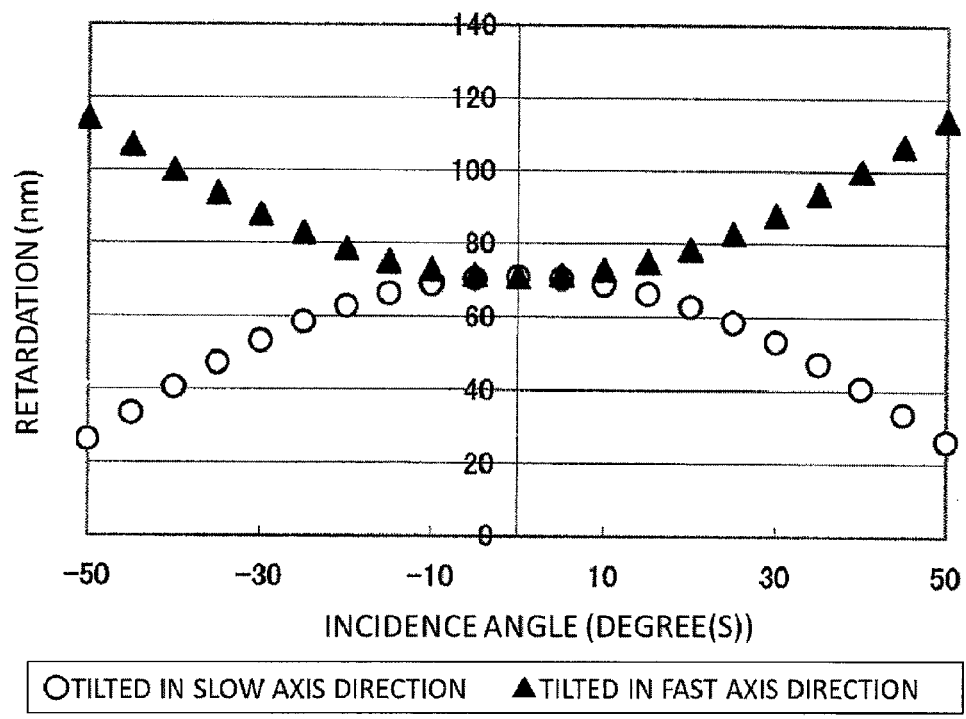
FIG. 4 is a view showing the viewing angle-retardation characteristics of a retardation film 2 in Example 2.
Figure 5:
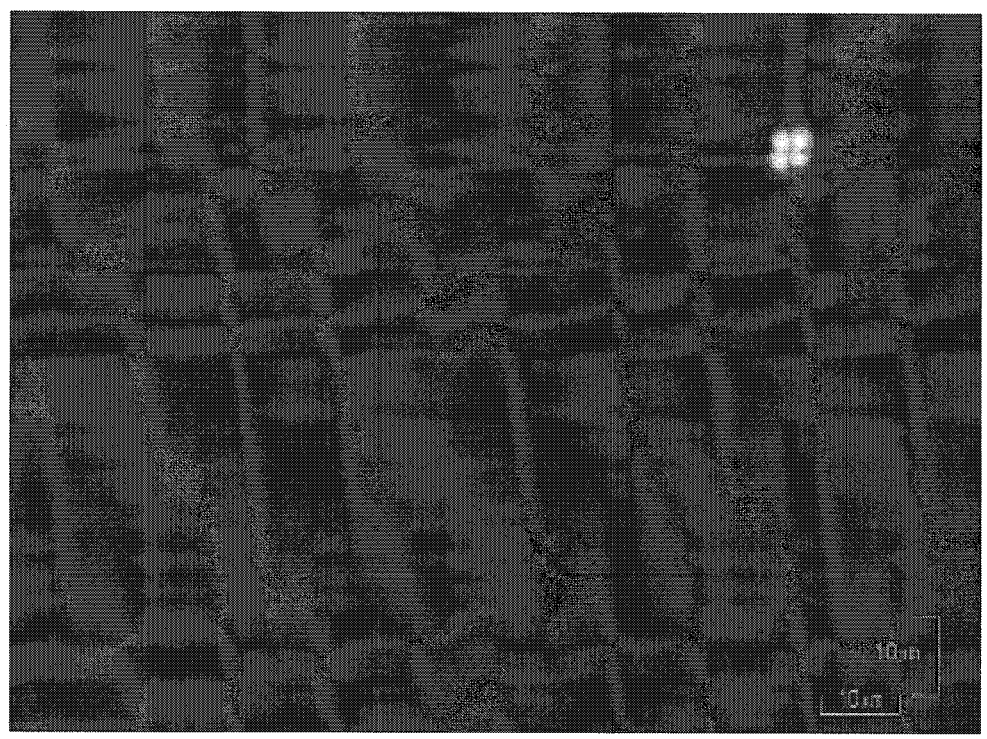
FIG. 5 is a polarization microscope photograph of the retardation film 2.

FIG. 4 shows results obtained by measuring the retardation of the retardation film 2 with an ellipsometer while tilting the film in the slow axis direction or fast axis direction of the retardation film 1. It was confirmed from the results of the measurement of FIG. 4 that the retardation film 2 was a retardation film obtained by forming, on a retardation film formed of the liquid crystalline polyimide having a photoreactive group that showed positive uniaxiality and whose optical axis was parallel to its thin-film surface, a retardation film that showed negative uniaxiality and whose optical axis coincided with the normal direction of its thin-film surface. Further, FIG. 5 shows the manner in which the substrate on which the retardation film 2 was formed was observed with a polarization microscope under the following conditions: the substrate of the retardation film 2 was interposed between crossed-Nicol polarizers, and the orientation of the slow axis of the retardation film 1 and the orientation of the absorption axis of one of the polarizers coincided with each other. It should be noted that in the photograph of FIG. 5, a good dark field was obtained, and no bright spot or bright line resulting from an alignment defect in the polymerizable cholesteric liquid crystal of the retardation film 2 was observed. Accordingly, it was confirmed that good alignment of the polymerizable (cholesteric) liquid crystal was obtained on the retardation film 1 and that the retardation film of the liquid crystalline polyimide having a photoreactive group had a function of aligning the polymerizable (cholesteric) liquid crystal as well. It should be noted that a bright spot in FIG. 5 is due to the fact that the photographing was performed while the site of an alignment failure resulting from foreign matter produced on the retardation film 1 was included on purpose in order that a contrast might be adjusted at the time of the photographing.

Next, a liquid crystal display device optically compensated with a plurality of retardation films including the retardation film of the positive A-plate formed of the liquid crystalline polyimide having a photoreactive group was evaluated for its viewing angle characteristic by means of optical calculation. It should be noted that an LCD Master Ver. 6.23 manufactured by SHINTECH, Inc. was used in the optical calculation.

Example 3

Viewing Angle Characteristic of Liquid Crystal Display Device of VA Mode Provided with Retardation Film Based on Liquid Crystalline Polyimide Having Photoreactive Group Tables 6 and 7 each show a viewing angle characteristic in the case where a liquid crystal display device of a VA mode having a horizontal rectangular image display part is optically compensated with a plurality of retardation films including a retardation film of a positive A-plate formed of a liquid crystalline polyimide having a photoreactive group.

In the tables, the term "p A-plate" represents the retardation film of the positive A-plate formed of the liquid crystalline polyimide having a photoreactive group, the term "n C-plate" represents a negative C-plate, and the term "Biaxial (I)" represents a retardation film of a biaxial plate (I).

The tables show retardations Re and Rth, Nz, and the axial angle of an optical axis or the absorption axis of a polarizer as optical parameters (λ=550 nm) of those retardation films, the polarizer, and a driving liquid crystal medium (VA cell). The optical axis or axial angle, retardation Re or Rth, and Nz of a retardation film, and the axial angle of the absorption axis of the polarizer comply with the definition described in the foregoing. That is, an angle formed by nx as an optical axis is an angle of the nx formed with respect to an X-axis, and the X-axis is an axis parallel to the horizontal direction of the liquid crystal display device and is an axis parallel to the long side of the image display part. The retardation Rth of the VA cell is the product of a difference between its extraordinary light refractive index ne and its ordinary light refractive index no, and the thickness d of the VA cell.

Upon evaluation of the liquid crystal display device for its optical characteristics, an angle formed between the direction of the line of sight of an observer and an optical device is represented by polar coordinates (an azimuth angle ($\phi$) and a polar angle ($\theta$)), and its definition is illustrated in FIG. 3. Whether the viewing angle characteristic of the liquid crystal display device is good or bad is judged on the basis of whether a luminance determined by calculation in a dark state in which no voltage is applied to the driving liquid crystal medium (VA cell) in a specific viewing angle direction (having a polar angle of 80°) is high or low. Tables 6 and 7 each show the result of such calculation as well.

In Table 6, Comparative Example 1 is the case where absolutely no retardation film for optical compensation exists, Invention Example 1 to Invention Example 4 are each an example in which optical compensation is performed only with the retardation film (p A-plate) formed of the liquid crystalline polyimide having a photoreactive group that shows positive uniaxiality and whose optical axis is parallel to its thin-film surface, and Invention Example 5 to Invention Example 10 are each an example in which optical compensation is performed with the retardation film (p A-plate) and the retardation film (n C-plate) as a negative C-plate.

Figure 6:
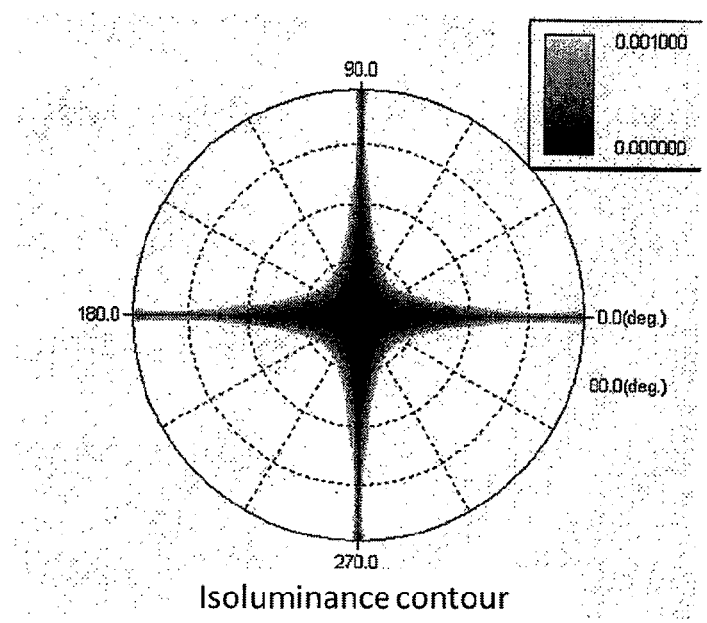
FIG. 6 is a view showing the isoluminance characteristic in a dark state of Comparative Example 1 (halftone image).
Figure 7:
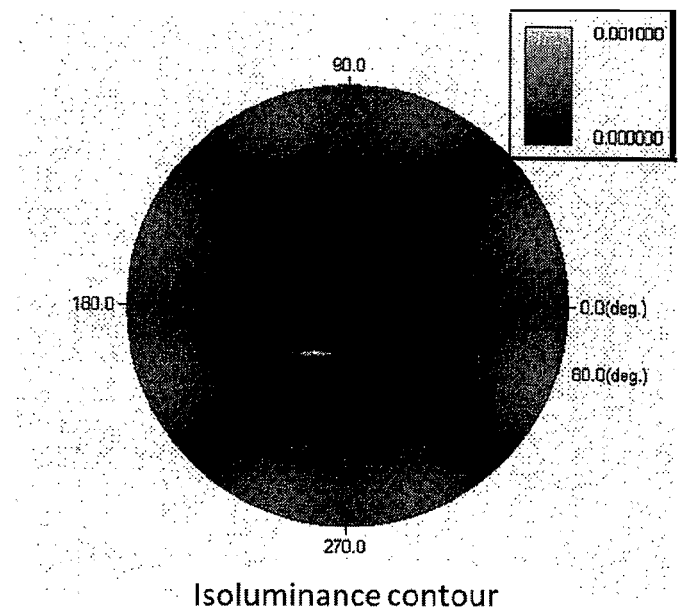
FIG. 7 is a view showing the isoluminance characteristic in a dark state of Invention Example 6 (halftone image).
Figure 8:
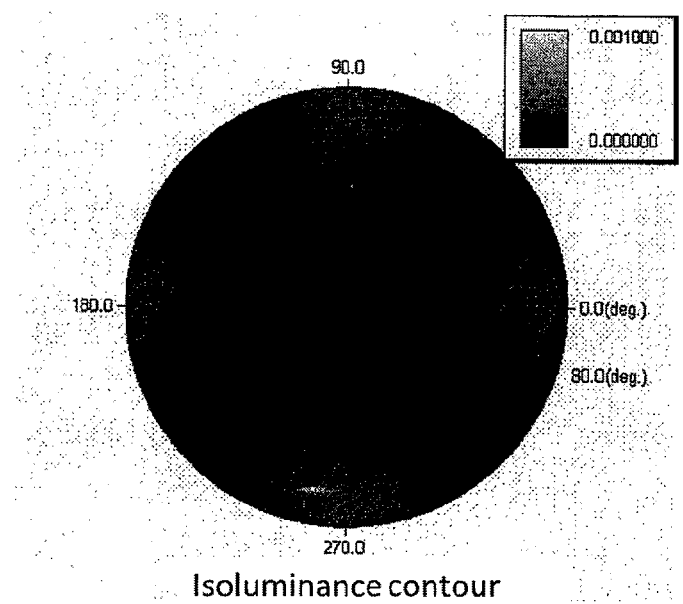
FIG. 8 is a view showing the isoluminance characteristic in a dark state of Invention Example 7 (halftone image).

In each of Invention Examples 1 to 10 in Table 6, as compared with Comparative Example 1, the luminance in the viewing angle direction (having a polar angle of 80°) is low in the dark state in which no voltage is applied to the driving liquid crystal medium (VA cell), and hence the viewing angle characteristic is improved. In addition, FIGS. 6, 7, and 8 show the viewing angle characteristics of the luminances of Comparative Example 1, and Invention Examples 6 and 7 in the dark state, respectively.

In Table 7, Comparative Examples 2, 3, and 4 are each an example in which optical compensation is performed only with one layer of the retardation film (Biaxial (I)) as the retardation film of the biaxial plate (I). Retardation films (Biaxial (I)) different from one another in Nz are used in Comparative Examples 2, 3, and 4, and are each provided with the retardations Re and Rth so that the maximum luminance value at a polar angle of 80° may be the lowest.

In Table 7, Invention Examples 11 to 14 are each an example in which optical compensation is performed by adding, to one layer of the retardation film (Biaxial (I)) as the retardation film of the biaxial plate (I), one layer of the retardation film (p A-plate) formed of the liquid crystalline polyimide having a photoreactive group that shows positive uniaxiality and whose optical axis is parallel to its thin-film surface. Invention Example 11 corresponds to Comparative Example 2 and Invention Example 12 corresponds to Comparative Example 3. Invention Examples 13 and 14 each correspond to Comparative Example 4, and are optically compensated with the retardation films (Biaxial (I)) having the same magnitude of the Nz, and the same retardations Re and Rth.

In Tables 6 and 7, as compared with each comparative example, in each invention example, the luminance in the viewing angle direction (having a polar angle of 80°) is low in the dark state in which no voltage is applied to the driving liquid crystal medium (VA cell), and hence the viewing angle characteristic is improved.

TABLE 6

| | ←Observer side | | | Construction of optical component | | | | | Light source side→ | | | | |
| --- | --- | --- | --- | --- | --- | --- | --- | --- | --- | --- | --- | --- | --- |
| | Absorption axis of polarizer (degree(s)) | Polarizer protective layer Rth | p A-plate Optical axis Re | n C-plate Rth | p A-plate Optical axis Re | Driving liquid crystal medium (VA) Rth | p A-plate Optical axis Re | n C-plate Rth | p A-plate Optical axis Re | Polarizer protective layer Rth | Absorption axis of polarizer (degree(s)) | Luminance (relative value) $\theta = 45°$, $\phi = 80°$ | Maximum luminance (relative value) $\phi = 80°$ | Isoluminance characteristic |
| Comparative Example 1 | 0 | 40 nm | | | | 300 nm | | | | 40 nm | 90 | 0.06415 | 0.06415 | FIG. 6 |
| Invention Example 1 | 0 | 40 nm | 90° 200 nm | | 0° 130 nm | 300 nm | | | 0° 100 nm | 40 nm | 90 | 0.00036 | 0.00264 | — |
| Invention Example 2 | 0 | 40 nm | 90° 210 nm | | 0° 120 nm | 300 nm | 0° 120 nm | | 90° 210 nm | 40 nm | 90 | 0.00243 | 0.00347 | — |
| Invention Example 3 | 0 | 40 nm | 90° 310 nm | | 0° 160 nm | 300 nm | 90° 160 nm | | 0° 310 nm | 40 nm | 90 | 0.00096 | 0.00096 | — |
| Invention Example 4 | 0 | 0 nm | 90° 330 nm | | 0° 160nm | 300 nm | 90° 160 nm | | 0° 330 nm | 0 nm | 90 | 0.00036 | 0.00038 | — |
| Invention Example 5 | 0 | 40 nm | | 160 nm | | 300 nm | | | 0° 100 nm | 40 nm | 90 | 0.00012 | 0.00046 | — |
| Invention Example 6 | 0 | 40 nm | 90° 100 nm | 160 nm | | 300 nm | | | | 40 nm | 90 | 0.00011 | 0.00046 | FIG. 7 |
| Invention Example 7 | 0 | 40 nm | 90° 60 nm | 60 nm | | 300 nm | | 60 nm | 0° 60 nm | 40 nm | 90 | 0.00005 | 0.00024 | FIG. 8 |
| Invention Example 8 | 0 | 40 nm | | 190 nm | 90° 40 nm | 300 nm | | | | 40 nm | 90 | 0.00055 | 0.00240 | — |

TABLE 6-continued

| | ←Observer side | | Construction of optical component | | | | | | | Light source→ | | | |
|---|---|---|---|---|---|---|---|---|---|---|---|---|---|
| | Absorption axis of polarizer (degree(s)) | Polarizer protective layer Rth | p A-plate Optical axis Re | n C-plate Rth | p A-plate Optical axis Re | Driving liquid crystal medium (VA) Rth | p A-plate Optical axis Re | n C-plate Rth | p A-plate Optical axis Re | Polarizer protective layer Rth | Absorption axis of polarizer (degree(s)) | Luminance (relative value) θ = 45°, φ = 80° | Maximum luminance (relative value) φ = 80° | Iso-luminance characteristic |
| Invention Example 9 | 0 | 0 nm | 90° 140 nm | 210 nm | | 300 nm | | | | 0 nm | 90 | 0.00006 | 0.00042 | — |
| Invention Example 10 | 0 | 0 nm | 90° 90 nm | 70 nm | | 300 nm | | 70 nm | 0° 90 nm | 0 nm | 90 | 0.00027 | 0.00027 | — |

TABLE 7

| | ←Observer side | | Construction of optical component | | | | | Light source side→ | | | |
|---|---|---|---|---|---|---|---|---|---|---|---|
| | Absorption axis of polarizer (degree(s)) | Polarizer protective layer Rth | p A-plate Optical axis Re | Biaxial (I) Nz Re Rth Optical axis | p A-plate Optical axis Re | Driving liquid crystal medium (VA) Rth | p A-plate Optical axis Re | Polarizer protective layer Rth | Absorption axis of polarizer (degree(s)) | Luminance (relative value) θ = 45°, φ = 80° | Maximum luminance (relative value) φ = 80° |
| Comparative Example 2 | 0 | 40 nm | | 4.0 60 nm 210 nm 90° | | 300 nm | | 40 nm | 90 | 0.00015 | 0.00116 |
| Invention Example 11 | 0 | 40 nm | | 4.0 48 nm 168 nm 90° | | 300 nm | 0° 50 nm | 40 nm | 90 | 0.00004 | 0.00036 |
| Comparative Example 3 | 0 | 0 nm | | 4.5 71 nm 284 nm 90° | | 300 nm | | 40 nm | 90 | 0.00003 | 0.00169 |
| Invention Example 12 | 0 | 0 nm | | 4.5 62 nm 249 nm 90° | | 300 nm | 0° 40 nm | 40 nm | 90 | 0.00015 | 0.00107 |
| Comparative Example 4 | 0 | 40 nm | | 5.0 46 nm 207 nm 90° | | 300 nm | | 40 nm | 90 | 0.00123 | 0.00146 |
| Invention Example 13 | 0 | 40 nm | 90° 40 nm | 5.0 40 nm 180 nm 90° | | 300 nm | | 40 nm | 90 | 0.00008 | 0.00094 |
| Invention Example 14 | 0 | 40 nm | | 5.0 40 nm 180 nm 90° | 90° 40 nm | 300 nm | | 40 nm | 90 | 0.00032 | 0.00150 |

<Viewing Angle Characteristic of Liquid Crystal Display Device of IPS Mode Provided with Retardation Film Based on Liquid Crystalline Polyimide Having Photoreactive Group>

Table 8 shows a viewing angle characteristic in the case where a liquid crystal display device of an IPS mode having a horizontal rectangular image display part is optically compensated with a plurality of retardation films including a retardation film of a positive A-plate formed of a liquid crystalline polyimide having a photoreactive group.

In the table, the term "p A-plate" represents the retardation film of the positive A-plate formed of the liquid crystalline polyimide having a photoreactive group and the term "p C-plate" represents the retardation film of the positive C-plate.

The table shows retardations Re and Rth, and the axial angle of an optical axis or the absorption axis of a polarizer as optical parameters (λ=550 nm) of those retardation films, the polarizer, and a driving liquid crystal medium (IPS cell). The optical axis and retardation Re or Rth of a retardation film, and the axial angle of the absorption axis of the polarizer comply with the definition described in the foregoing. The retardation Re of the IPS cell is the product of a difference between its extraordinary light refractive index ne and its ordinary light refractive index no, and the thickness d of the IPS cell.

Upon evaluation of the liquid crystal display device for its optical characteristics, an angle formed between the direction of the line of sight of an observer and an optical device is represented by polar coordinates (an azimuth angle (φ) and a polar angle (θ)), and its definition is illustrated in FIG. 3. Whether the viewing angle characteristic of the liquid crystal display device is good or bad is judged on the basis of whether a contrast ratio determined by calculation, the ratio being represented as a ratio (luminance in a light state/luminance in a dark state) between a luminance in a light state in which a voltage is applied to the driving liquid crystal medium (IPS cell) and a luminance in a dark state in which no voltage is applied in a specific viewing angle direction (having a polar angle of 80°), is high or low. In the table, the "contrast" is a value for the contrast ratio at an azimuth angle of 45° and a polar angle of 80°. In addition, in the table, the "minimum contrast" is the minimum value for the contrast ratio at a polar angle of 80°. The contrast ratio of the driving liquid crystal medium (IPS cell) was calculated by defining the axial angle of the optical axis in the dark state in which no voltage was applied as 0° and the angle in the light state in which a voltage was applied as 45°.

Comparative Examples 5 and 6 are each the case where absolutely no retardation film for optical compensation exists, and Invention Example 15 to Invention Example 23 are each an example in which optical compensation is performed with the retardation film (p A-plate) formed of the liquid crystalline polyimide having a photoreactive group that shows positive uniaxiality and whose optical axis is parallel to its thin-film surface, and the retardation film (p C-plate) as a positive C-plate.

Figure 9:
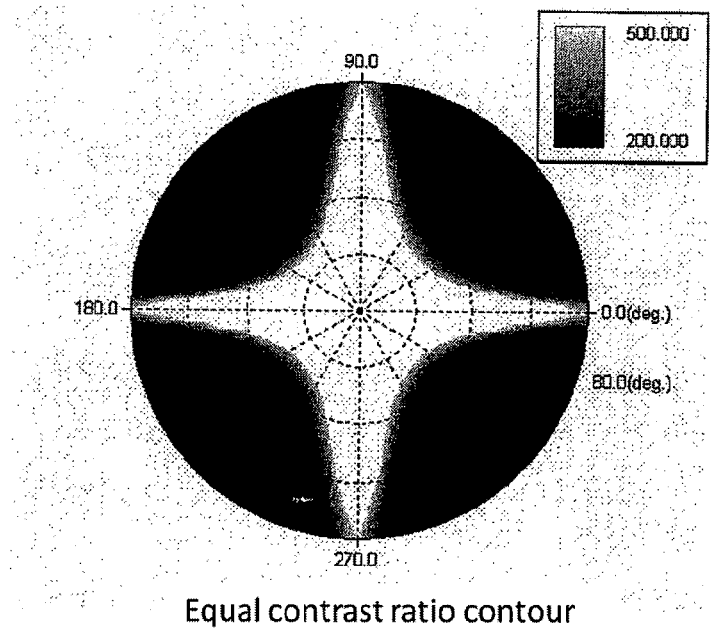
FIG. 9 is a view showing the equal contrast ratio characteristic of Comparative Example 5 (halftone image).
Figure 10:
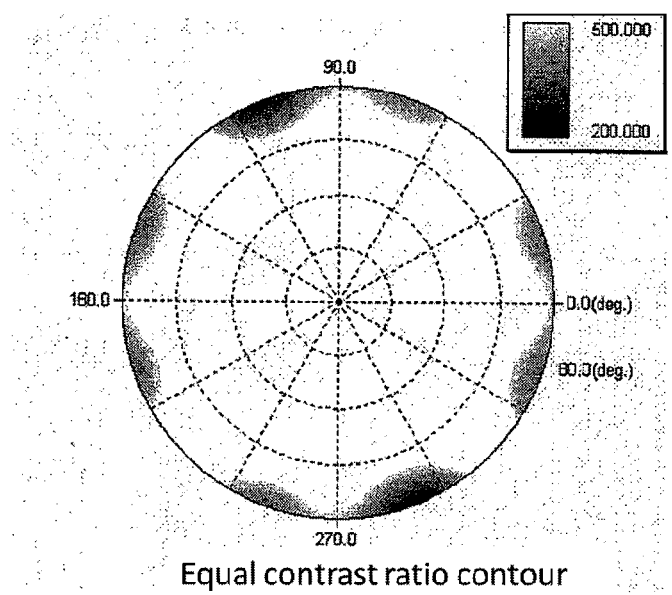
FIG. 10 is a view showing the equal contrast ratio characteristic of Invention Example 16 (halftone image).
Figure 11:
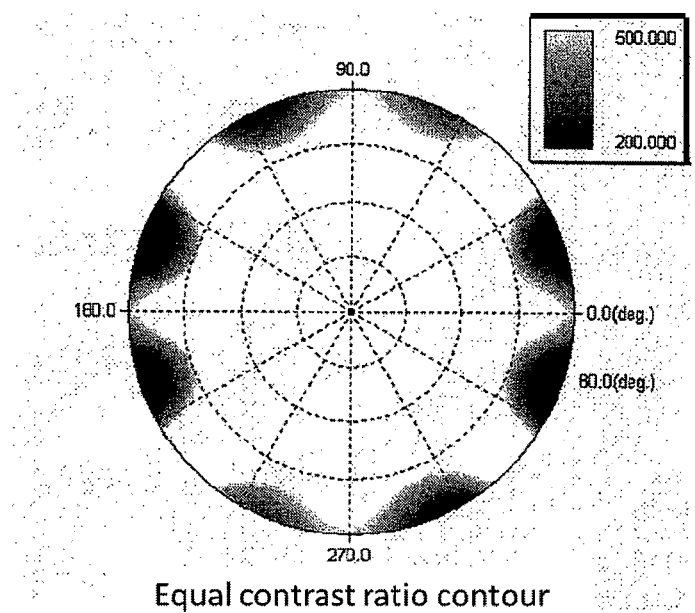
FIG. 11 is a view showing the equal contrast ratio characteristic of Invention Example 22 (halftone image).

In each of Invention Examples 15 to 23, as compared with Comparative Examples 5 and 6, the contrast ratio in the viewing angle direction (having a polar angle of 80°) is high, and hence the viewing angle characteristic is improved. In addition, FIGS. 9, 10, and 11 show the viewing angle characteristics of the luminances of Comparative Example 5, and Invention Examples 16 and 22 in the dark state, respectively.

a horizontal rectangular image display part is optically compensated with a plurality of retardation films including a retardation film of a positive A-plate formed of a liquid crystalline polyimide having a photoreactive group.

In the table, the term "p A-plate" represents the retardation film of the positive A-plate formed of the liquid crystalline polyimide having a photoreactive group and the term "p C-plate" represents the retardation film of the positive C-plate.

The table shows retardations Re and Rth, and the axial angle of an optical axis or the absorption axis of a polarizer as optical parameters ($\lambda$=550 nm) of those retardation films and the polarizer. The optical axis and retardation Re or Rth of a retardation film, and the axial angle of the absorption axis of the polarizer comply with the definition described in the foregoing.

Upon evaluation of the liquid crystal display device for its optical characteristics, an angle formed between the direction of the line of sight of an observer and an optical device is represented by polar coordinates (an azimuth angle ($\phi$) and a polar angle ($\theta$)), and its definition is illustrated in FIG. 3. Whether the viewing angle characteristic of the liquid crystal display device is good or bad is judged on the basis of whether a contrast ratio determined by calculation, the ratio being represented as a ratio (luminance in a light state/luminance in a dark state) between a luminance in a light state in which a voltage is applied to the driving liquid crystal medium (ISP cell) and a luminance in a dark state in which no voltage is applied in a specific viewing angle direction (having a polar angle of 80°), is high or low. In the table, the "contrast" is a value for the contrast ratio at an azimuth angle of 45° and a

TABLE 8

| | ←Observer side | | Construction of optical component | | | | | | | Light source side→ | | | |
|---|---|---|---|---|---|---|---|---|---|---|---|---|---|
| Example | Absorption axis of polarizer (degree(s)) | Polarizer protective layer Rth | p A-plate Optical axis Re | n C-plate Rth | p A-plate Optical axis Re | Driving liquid crystal medium (IPS) Re | p A-plate Optical axis Re | n C-plate Rth | Polarizer protective layer Rth | Absorption axis of polarizer (degree(s)) | Contrast $\theta = 45°$, $\phi = 80°$ | Minimum contrast $\phi = 80°$ | Equal contrast ratio characteristic |
| Comparative Example 5 | 90 | 40 nm | | | | 300 nm | | | 40 nm | 0 | 14 | 6 | FIG. 9 |
| Comparative Example 6 | 90 | 0 nm | | | | 300 nm | | | 0 nm | 0 | 11 | 8 | — |
| Invention Example 15 | 90 | 40 nm | 0° 100 nm | −80 nm | | 300 nm | | | 40 nm | 0 | 431 | 39 | — |
| Invention Example 16 | 90 | 0 nm | 0° 140 nm | −100 nm | | 300 nm | | | 0 nm | 0 | 1314 | 211 | FIG. 10 |
| Invention Example 17 | 90 | 40 nm | | −50 nm | 0° 100 nm | 300 nm | | | 40 nm | 0 | 27 | 10 | — |
| Invention Example 18 | 90 | 40 nm | | −150 nm | 90° 170 nm | 300 nm | | | 40 nm | 0 | 235 | 46 | — |
| Invention Example 19 | 0 | 40 nm | | −220 nm | 90° 130 nm | 300 nm | | | 40 nm | 90 | 540 | 19 | — |
| Invention Example 20 | 90 | 40 nm | | −50 nm | | 300 nm | 0° 90 nm | | 40 nm | 0 | 31 | 19 | — |
| Invention Example 21 | 90 | 40 nm | | −160 nm | 90° 130 nm | 300 nm | | −70 nm | 40 nm | 0 | 2960 | 260 | — |
| Invention Example 22 | 90 | 40 nm | | −160 nm | 90° 130 nm | 300 nm | 0° 70 nm | | 40 nm | 0 | 1894 | 130 | FIG. 11 |
| Invention Example 23 | 90 | 40 nm | | −50 nm | 0° 50 nm | 300 nm | 0° 50 nm | | 40 nm | 0 | 28 | 13 | — |

<Viewing Angle Characteristic of Liquid Crystal Display Device of ISP Mode Provided with Retardation Film Based on Liquid Crystalline Polyimide Having Photoreactive Group>

Table 9 shows a viewing angle characteristic in the case where a liquid crystal display device of an ISP mode having polar angle of 80°. In addition, in the table, the "minimum contrast" is the minimum value for the contrast ratio at a polar angle of 80°. The contrast ratio of the driving liquid crystal medium (ISP cell) was calculated by defining the retardation in the dark state in which no voltage was applied as zero and the retardation in the light state in which a voltage was applied as 240 nm, and the axial angle of the optical axis as 45°.

Comparative Examples 7 and 8 are each the case where absolutely no retardation film for optical compensation exists, and Invention Example 24 to Invention Example 29 are each an example in which optical compensation is performed with the retardation film (p A-plate) formed of the liquid crystalline polyimide having a photoreactive group that shows positive uniaxiality and whose optical axis is parallel to its thin-film surface, and the retardation film (p C-plate) as a positive C-plate.

In each of Invention Examples 24 to 29, as compared with Comparative Examples 7 and 8, the contrast ratio in the viewing angle direction (having a polar angle of 80°) is high, and hence the viewing angle characteristic is improved.

TABLE 9

| | ←Observer side | | Construction of optical component | | | | | | Light source side→ | | |
|---|---|---|---|---|---|---|---|---|---|---|---|
| Example | Absorption axis of polarizer (degree(s)) | Polarizer protective layer Rth | p A-plate Optical axis Re | p C-plate Rth | p A-plate Optical axis Re | Driving liquid crystal medium (ISP) Re | p A-plate Optical axis Re | p C-plate Rth | Polarizer protective layer Rth | Absorption axis of polarizer (degree(s)) | Contrast θ = 45°, φ = 80° | Minimum contrast φ = 80° |
| Comparative Example 7 | 90 | 40 nm | | | | Dark state Re = 0 nm | | | 40 nm | 0 | 4 | 4 |
| Comparative Example 8 | 90 | 0 nm | | | | Dark state Re = 0 nm | | | 0 nm | 0 | 10 | 10 |
| Invention Example 24 | 90 | 40 nm | 0° 110 nm | −170 nm | | Dark state Re = 0 nm | | | 40 nm | 0 | 1909 | 186 |
| Invention Example 25 | 90 | 0 nm | 0° 140 nm | −100 nm | | Dark state Re = 0 nm | | | 0 nm | 0 | 1425 | 252 |
| Invention Example 26 | 90 | 40 nm | | | 0° 110 nm | Dark state Re = 0 nm | | −170 nm | 40 nm | 0 | 2006 | 198 |
| Invention Example 27 | 90 | 0 nm | | −100 nm | | Dark state Re = 0 nm | 90° 140 nm | | 0 nm | 0 | 1204 | 253 |
| Invention Example 28 | 90 | 0 nm | | −100 nm | 90° 70 nm | Dark state Re = 0 nm | 90° 70 nm | | 0 nm | 0 | 1222 | 228 |
| Invention Example 29 | 90 | 0 nm | | −50 nm | 90° 150 nm | Dark state Re = 0 nm | 0° 150 nm | −50 nm | 0 nm | 0 | 2664 | 463 |

INDUSTRIAL APPLICABILITY

In the retardation film of the present invention, the optical alignment is obtained by the application of light in a specific polarization state because the film uses a liquid crystalline polyimide film having a photoreactive group. In addition, the retardation film can be provided with smaller numbers of members and steps than those of a conventional production method for a retardation film based on an alignment layer and a liquid crystalline material typified by a polymerizable liquid crystal material.

In addition, the retardation film of the present invention can be caused to function as an alignment layer for a liquid crystal material typified by a driving liquid crystal medium or a polymerizable liquid crystal material, and can be provided by additionally simplified production steps with reduced numbers of members and steps even in the production of a liquid crystal display device to be optically compensated with a plurality of retardation films.

REFERENCE SIGNS LIST

1 axial angle of optical axis of retardation film
2 axial angle of absorption axis of polarizer
3 direction of line of sight of observer
4 incidence plane
5 azimuth angle (φ)
6 polar angle (θ)

The invention claimed is:

1. A liquid crystal display device, comprising:
   a driving liquid crystal layer selected from the group consisting of
      a driving liquid crystal layer in which a liquid crystal molecule in a driving liquid crystal medium is aligned in a direction vertical to a substrate when no electric field is applied,
      a driving liquid crystal layer in which a liquid crystal molecule in a driving liquid crystal medium is aligned in a direction horizontal to the substrate when no electric field is applied, and
      a driving liquid crystal layer that is optically isotropic when no electric field is applied; and
   an optical compensator for alleviating a deterioration in display quality in a viewing angle direction,
   wherein the optical compensator has a retardation film of a positive A-plate formed of a liquid crystalline polyimide having a photoreactive group.

2. The liquid crystal display device according to claim 1, wherein the optical compensator is two or more layers of retardation films, and at least one layer thereof is the retardation film of the positive A-plate formed of the liquid crystalline polyimide having a photoreactive group.

3. The liquid crystal display device according to claim 1, further comprising one or more polarizers, wherein the optical compensator is provided between each of the polarizers and the driving liquid crystal layer.

4. The liquid crystal display device according to claim 3, wherein:
   the driving liquid crystal layer is the driving liquid crystal layer in which the liquid crystal molecule is aligned in the direction vertical to the substrate when no electric field is applied;
   the optical compensator has at least two layers of retardation films of positive A-plates each formed of the liquid crystalline polyimide containing a photoreactive group; and
   the two layers of the retardation films of the positive A-plates each formed of the liquid crystalline polyimide containing a photoreactive group are provided between the driving liquid crystal layer and one of the polarizers so that optical axes thereof are perpendicular to each other.

5. The liquid crystal display device according to claim 1, wherein:
the driving liquid crystal layer comprises the driving liquid crystal layer in which the liquid crystal molecule is aligned in the direction vertical to the substrate when no electric field is applied; and
the optical compensator further has at least one layer of a retardation film of a negative C-plate.

6. The liquid crystal display device according to claim 5, wherein at least one layer of the retardation film of the negative C-plate is an optically anisotropic layer in which alignment of a cholesteric liquid crystal having a helical pitch of less than 200 nm is immobilized by crosslinking or polymerization.

7. The liquid crystal display device according to claim 6, wherein one layer of the optically anisotropic layer is formed on the retardation film of the positive A-plate formed of the liquid crystalline polyimide having a photoreactive group.

8. The liquid crystal display device according to claim 5, wherein the retardation film of the positive A-plate formed of the liquid crystalline polyimide having a photoreactive group has a retardation $Re_I$ in a direction parallel to a surface of the retardation film in light having a wavelength of 550 nm of between 10 nm and 200 nm, and the retardation film of the negative C-plate has a total retardation $Rth_{II}$ in a normal direction of a surface of the retardation film in the light having a wavelength of 550 nm smaller than a retardation $Rth_{LC}$ of the driving liquid crystal layer in a thickness direction of the driving liquid crystal layer in the light having a wavelength of 550 nm where the $Re_I$ and the $Rth_{II}$ are represented by "$Re_I=(nx_I-ny_I)\cdot d_I$" and "$Rth_{II}=((nx_{II}+ny_{II})/2-nz_{II})\cdot d_I$," respectively, $nx_I$ and $ny_I$ represent two components ($nx_I>ny_I$) parallel to a thin-film surface out of three-dimensional refractive indices of the positive A-plate, and $d_I$ represents a thickness of the plate, $nx_{II}$, $ny_{II}$, $nz_{II}$, and $d_{II}$ represent three-dimensional refractive indices and a thickness of the negative C-plate, respectively, the $nx_{II}$ and the $ny_{II}$ ($nx_{II}=ny_{II}$) represent refractive indices in directions parallel to a thin-film surface, and the $nz_{II}$ represents a refractive index in a normal direction of the thin-film surface, and the $Rth_{LC}$ of the driving liquid crystal medium is a numerical value obtained in accordance with definition "$Rth_{LC}=(ne-no)\cdot d_{LC}$" when ordinary light and extraordinary light refractive indices, and a thickness of the driving liquid crystal medium are represented by no, ne, and $d_{LC}$, respectively.

9. The liquid crystal display device according to claim 1, wherein when refractive indices in directions parallel to a surface of a retardation film are represented by nx and ny provided that the relationship of nx>ny is satisfied, and a refractive index in a normal direction of the surface of the retardation film is represented by nz, the driving liquid crystal layer is the driving liquid crystal layer in which the liquid crystal molecule is aligned in the direction vertical to the substrate when no electric field is applied, and the optical compensator has at least one layer of a retardation film showing biaxiality of nx>ny>nz.

10. The liquid crystal display device according to claim 9, wherein at least one layer of the retardation film showing the biaxiality is an optically anisotropic layer in which a periodic change is caused in a helical pitch in a spiral axis direction in spiral alignment of a cholesteric liquid crystal having a helical pitch of less than 200 nm by irradiating the cholesteric liquid crystal with polarized ultraviolet light having an electric field vector in a direction vertical to a spiral axis, and the alignment of the liquid crystal is immobilized by crosslinking or polymerization.

11. The liquid crystal display device according to claim 10, wherein one layer of the optically anisotropic layer is formed on the retardation film of the positive A-plate formed of the liquid crystalline polyimide having a photoreactive group.

12. The liquid crystal display device according to claim 1, wherein:
the driving liquid crystal layer is the driving liquid crystal layer in which the liquid crystal molecule is aligned in the direction horizontal to the substrate when no electric field is applied; and
the optical compensator further has a retardation film of a positive C-plate.

13. The liquid crystal display device according to claim 12, wherein the retardation film of the positive C-plate includes an optically anisotropic layer in which vertical alignment of a liquid crystal is immobilized by crosslinking or polymerization.

14. The liquid crystal display device according to claim 12, wherein the retardation film of the positive A-plate formed of the liquid crystalline polyimide having a photoreactive group has a retardation $Re_I$ in a direction parallel to a surface of the retardation film in light having a wavelength of 550 nm of between 10 nm and 200 nm, and the retardation film of the positive C-plate has a retardation $Rth_{III}$ in a normal direction of a surface of the retardation film in the light having a wavelength of 550 nm of between $-200$ nm and $-10$ nm where the $Re_I$ is represented by "$Re_I=(nx_I-ny_I)\cdot d_I$", $nx_I$ and $ny_I$ represent two components ($nx_I>ny_I$) parallel to a thin-film surface out of three-dimensional refractive indices of the positive A-plate, and $d_I$ represents a thickness of the plate, the $Rth_{III}$ is represented by "$Rth_{III}=((nx_{III}+ny_{III})/2-nz_{III})\cdot d_{III}$", $nx_{III}$, $ny_{III}$, $nz_{III}$, and $d_{III}$ represent three-dimensional refractive indices and a thickness of the positive C-plate, respectively, the $nx_{III}$ and the $ny_{III}$ ($nx_{III}=ny_{III}$) represent refractive indices in directions parallel to a thin-film surface, and the $nz_{III}$ represents a refractive index in a normal direction of the thin-film surface.

15. The liquid crystal display device according to claim 1, wherein:
the driving liquid crystal layer comprises the driving liquid crystal layer that is optically isotropic when no electric field is applied; and
the optical compensator further has a retardation film of a positive C-plate.

16. The liquid crystal display device according to claim 1, comprising a color filter substrate having a color filter and a retardation film, wherein the retardation film includes the retardation film of the positive A-plate formed of the liquid crystalline polyimide containing a photoreactive group.

17. The liquid crystal display device according to claim 1, comprising an elliptically polarizer having a polarizer integrated with a retardation film, wherein the retardation film includes the retardation film of the positive A-plate formed of the liquid crystalline polyimide having a photoreactive group.

\* \* \* \* \*

UNITED STATES PATENT AND TRADEMARK OFFICE
CERTIFICATE OF CORRECTION

PATENT NO. : 8,730,435 B2
APPLICATION NO. : 13/384339
DATED : May 20, 2014
INVENTOR(S) : Kazuhiko Saigusa et al.

Page 1 of 1

It is certified that error appears in the above-identified patent and that said Letters Patent is hereby corrected as shown below:

In the Claims:

At column 47, line 34, Claim 8, change ""$Rth_{II}=((nx_{II}+ny_{II})/2-nz_{II})\cdot d_I,$"" to -- "$Rth_{II}=((nx_{II}+ny_{II})/2-nz_{II})\cdot d_{II},$" --.

Signed and Sealed this
Thirtieth Day of September, 2014

Michelle K. Lee
*Deputy Director of the United States Patent and Trademark Office*